United States Patent
Batcheller et al.

(10) Patent No.: US 9,797,801 B2
(45) Date of Patent: Oct. 24, 2017

(54) FREQUENCY-ADAPTABLE STRUCTURAL HEALTH AND USAGE MONITORING SYSTEM

(71) Applicants: Barry D. Batcheller, West Fargo, ND (US); Johan A. Wiig, Paris (FR)

(72) Inventors: Barry D. Batcheller, West Fargo, ND (US); Johan A. Wiig, Paris (FR)

(73) Assignee: Appareo Systems, LLC, Fargo, ND (US)

( * ) Notice: Subject to any disclaimer, the term of this patent is extended or adjusted under 35 U.S.C. 154(b) by 1293 days.

(21) Appl. No.: 13/764,617

(22) Filed: Feb. 11, 2013

(65) Prior Publication Data

US 2013/0211737 A1 Aug. 15, 2013

Related U.S. Application Data

(60) Provisional application No. 61/597,667, filed on Feb. 10, 2012.

(51) Int. Cl.
  *G01M 7/00* (2006.01)
  *G01M 17/08* (2006.01)
  *G07C 5/08* (2006.01)

(52) U.S. Cl.
  CPC .............. *G01M 7/00* (2013.01); *G01M 17/08* (2013.01); *G07C 5/085* (2013.01)

(58) Field of Classification Search
  CPC ........................................................ G01M 7/00
  USPC ............................................................ 702/34
  See application file for complete search history.

(56) References Cited

U.S. PATENT DOCUMENTS

| 3,732,366 A | 5/1973 | Bolie |
| 4,053,123 A | 10/1977 | Chadwick |
| 4,430,750 A | 2/1984 | Koellensperger |
| 4,499,595 A | 2/1985 | Masaitis et al. |
| 4,547,701 A | 10/1985 | Taylor et al. |
| 4,707,647 A | 11/1987 | Coldren et al. |
| 5,283,643 A | 2/1994 | Fujimoto |
| 5,316,240 A | 5/1994 | Girard et al. |
| 5,606,365 A | 2/1997 | Maurinus et al. |
| 5,854,994 A * | 12/1998 | Canada ................. G01H 1/003 340/3.63 |

(Continued)

FOREIGN PATENT DOCUMENTS

| CA | 2481176 | 3/2005 |
| CA | 2517045 | 2/2006 |

(Continued)

OTHER PUBLICATIONS

"International Search Report and Written Opinion", PCT/US2013/025638, (Jun. 17, 2013).

(Continued)

*Primary Examiner* — Ricky Ngon
(74) *Attorney, Agent, or Firm* — Law Office of Mark Brown, LLC; Mark E. Brown

(57) ABSTRACT

A structural health monitoring system comprising intelligent sensors, wherein the intelligent sensors are individually programmable and can be tuned to listen to specific frequencies based on a scaling factor based on the sensor's location in the system being monitored, a set of pre-known frequencies based on the sensor's location in the system being monitored, and the output of a central frequency-based system sensor.

5 Claims, 14 Drawing Sheets

| | | |
|---|---|---|
| MODE 1 | SIMPLE DATA RECORD MODE | DISTRIBUTED INTELLIGENT SENSORS RECORD FREQUENCY DATA AND TRANSMIT THE DATA TO THE PRIMARY DATA ACQUISITION UNIT FOR LATER ANALYSIS AND COMPARISON TO HISTORICAL TREND DATA. |
| MODE 2 | SYSTEM FAULT ALERT MODE | DISTRIBUTED INTELLIGENT SENSORS ANALYZE FREQUENCY DATA LOCALLY IN REAL-TIME AND REPORT FAULTS DETECTED AT THEIR LOCATION VIA A MESSAGE BROADCAST TO THE SYSTEM. IF A FAULT IS DETECTED, A CERTAIN LIMITED AMOUNT OF DIGITIZED DATA PRECEDING THE FAULT EVENT MAY BE BROADCAST FOR SUBSEQUENT ANALYSIS. |
| MODE 3 | ANALOG PASS-THROUGH MODE | DISTRIBUTED INTELLIGENT SENSORS ARE USED TO MIMIC OLDER STYLE SENSORS (SUCH AS PIEZOELECTRIC ANALOG SENSORS) BY SIMPLY DETECTING FREQUENCY DATA AND PASSING IT THROUGH AS AN ANALOG VOLTAGE ON ANALOG OUTPUTS. |
| MODE 4 | DIGITIZED WAVEFORM MODE | DISTRIBUTED INTELLIGENT SENSORS CAPTURE THE ANALOG FREQUENCY WAVEFORMS FROM THE COMPONENT THEY ARE MONITORING AND CONVERT IT TO DIGITAL DATA. THIS DIGITIZED WAVEFORM CAN THEN BE TRANSMITTED BY COMMUNICATION MESSAGE TO OTHER PARTS OF THE SYSTEM OR TO AN EXTERNAL SYSTEM. |

(56) References Cited

U.S. PATENT DOCUMENTS

| | | | |
|---|---|---|---|
| 5,974,158 A | 10/1999 | Auty et al. | |
| 6,111,242 A | 8/2000 | Afghahi | |
| 6,176,136 B1 | 1/2001 | Zoppitelli et al. | |
| 6,216,065 B1 | 4/2001 | Hall et al. | |
| 6,229,898 B1 | 5/2001 | Goodman | |
| 6,289,735 B1 | 9/2001 | Dister et al. | |
| 6,311,924 B1 | 11/2001 | Ferrer | |
| 6,321,602 B1 | 11/2001 | Ben-Romdhane | |
| 6,427,815 B1 | 8/2002 | Zeller | |
| 6,434,512 B1 | 8/2002 | Discenzo | |
| 6,553,131 B1 | 4/2003 | Neubauer et al. | |
| 6,597,406 B2 | 7/2003 | Gloudemans et al. | |
| 6,643,401 B1 | 11/2003 | Kashioka et al. | |
| 6,646,564 B1* | 11/2003 | Azieres | G08B 25/14 340/506 |
| 6,711,952 B2 | 3/2004 | Leamy et al. | |
| 6,754,368 B1 | 6/2004 | Cohen | |
| 6,954,228 B1 | 10/2005 | Achurya et al. | |
| 7,066,391 B2 | 6/2006 | Tsikos et al. | |
| 7,225,062 B2 | 5/2007 | Aubourg | |
| 7,400,950 B2 | 7/2008 | Reich | |
| 7,414,544 B2 | 8/2008 | Oltheten et al. | |
| 7,430,483 B2 | 9/2008 | Wiig | |
| 7,447,362 B2 | 11/2008 | Lev | |
| 7,477,780 B2 | 1/2009 | Boncyk et al. | |
| 7,505,604 B2 | 3/2009 | Zakrzewski et al. | |
| 7,551,783 B2 | 6/2009 | Johnson et al. | |
| 7,616,811 B2 | 11/2009 | Kalevo et al. | |
| 7,719,416 B2 | 5/2010 | Arms et al. | |
| 7,873,494 B2 | 1/2011 | Hadley et al. | |
| 8,306,778 B2 | 11/2012 | Leao et al. | |
| 2003/0196492 A1 | 10/2003 | Remboski et al. | |
| 2003/0229469 A1 | 12/2003 | Song | |
| 2004/0186636 A1 | 9/2004 | Mendelson et al. | |
| 2005/0074183 A1 | 4/2005 | Narlow | |
| 2006/0228102 A1 | 10/2006 | Yang et al. | |
| 2006/0259271 A1* | 11/2006 | House | G05B 23/0248 702/181 |
| 2006/0276185 A1* | 12/2006 | Ram | G07C 5/085 455/420 |
| 2007/0146689 A1 | 6/2007 | Araki et al. | |
| 2007/0236366 A1 | 10/2007 | Gur et al. | |
| 2008/0056535 A1 | 3/2008 | Bergmann et al. | |
| 2009/0201315 A1 | 8/2009 | Nishida | |
| 2009/0222142 A1* | 9/2009 | Kao | G05B 15/02 700/291 |
| 2010/0057277 A1 | 3/2010 | Goodrich et al. | |
| 2011/0001796 A1 | 1/2011 | Werjefelt et al. | |

FOREIGN PATENT DOCUMENTS

| | | |
|---|---|---|
| CA | 2606033 | 4/2008 |
| CN | 1627317 | 6/2005 |
| EP | 0407179 | 1/1991 |
| EP | 0541277 | 3/1997 |
| EP | 0601527 | 4/1997 |
| EP | 1085455 | 8/2006 |
| EP | 1604897 | 8/2008 |
| GB | 2428325 | 8/2007 |
| WO | WO-2008101167 | 8/2008 |
| WO | WO-2009026156 | 2/2009 |

OTHER PUBLICATIONS

"Optical Gauge Recognition", *Appareo Systems, LLC*, (Feb. 2009).
"International Preliminary Report on Patentability", PCT/US2013/025638, Aug. 21, 2014.
Culler, et al., "Smart Sensors to Network the World", Scientific American Magazine, Jun. 2004, pp. 85-91.

* cited by examiner

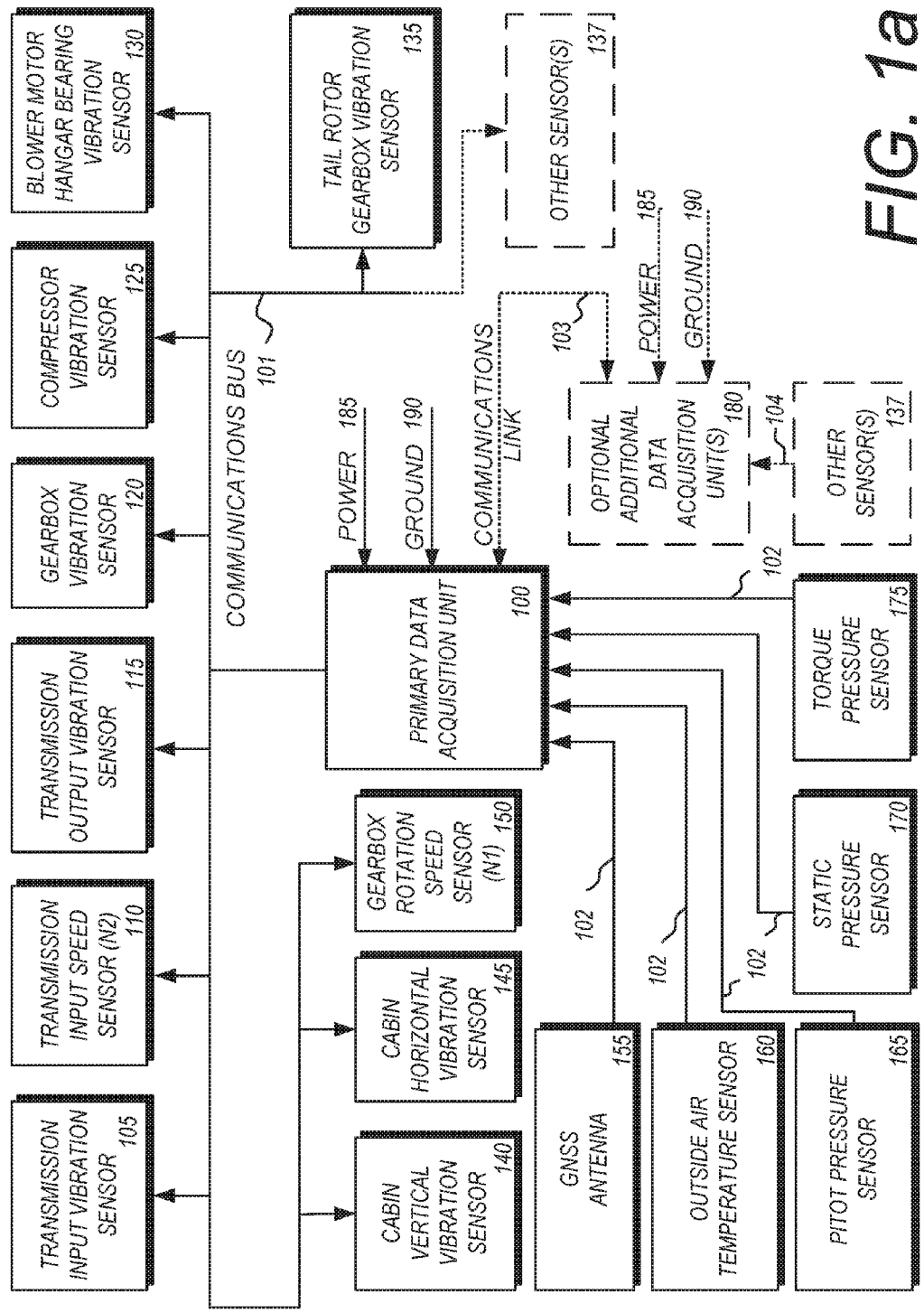

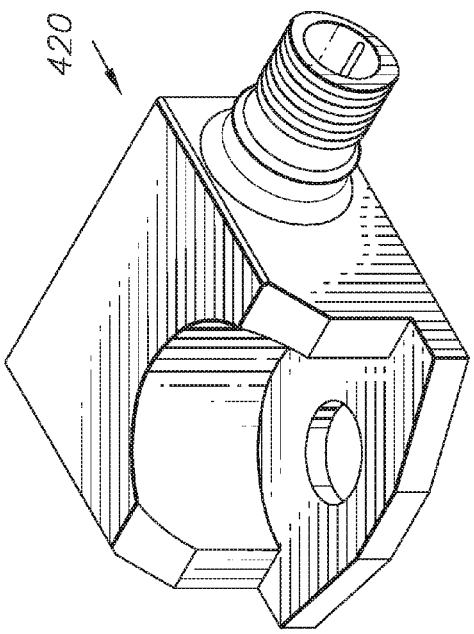
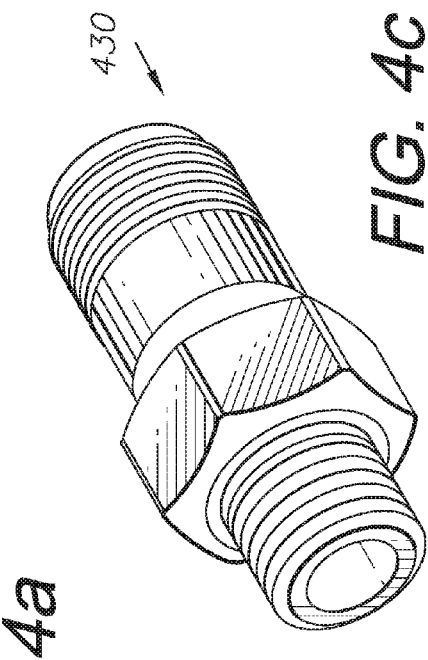
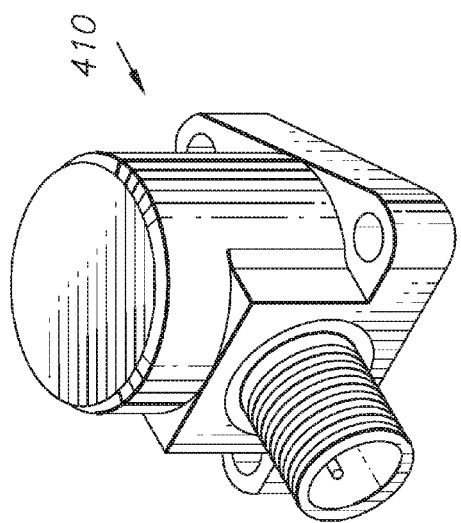
FIG. 4b
FIG. 4c
FIG. 4a

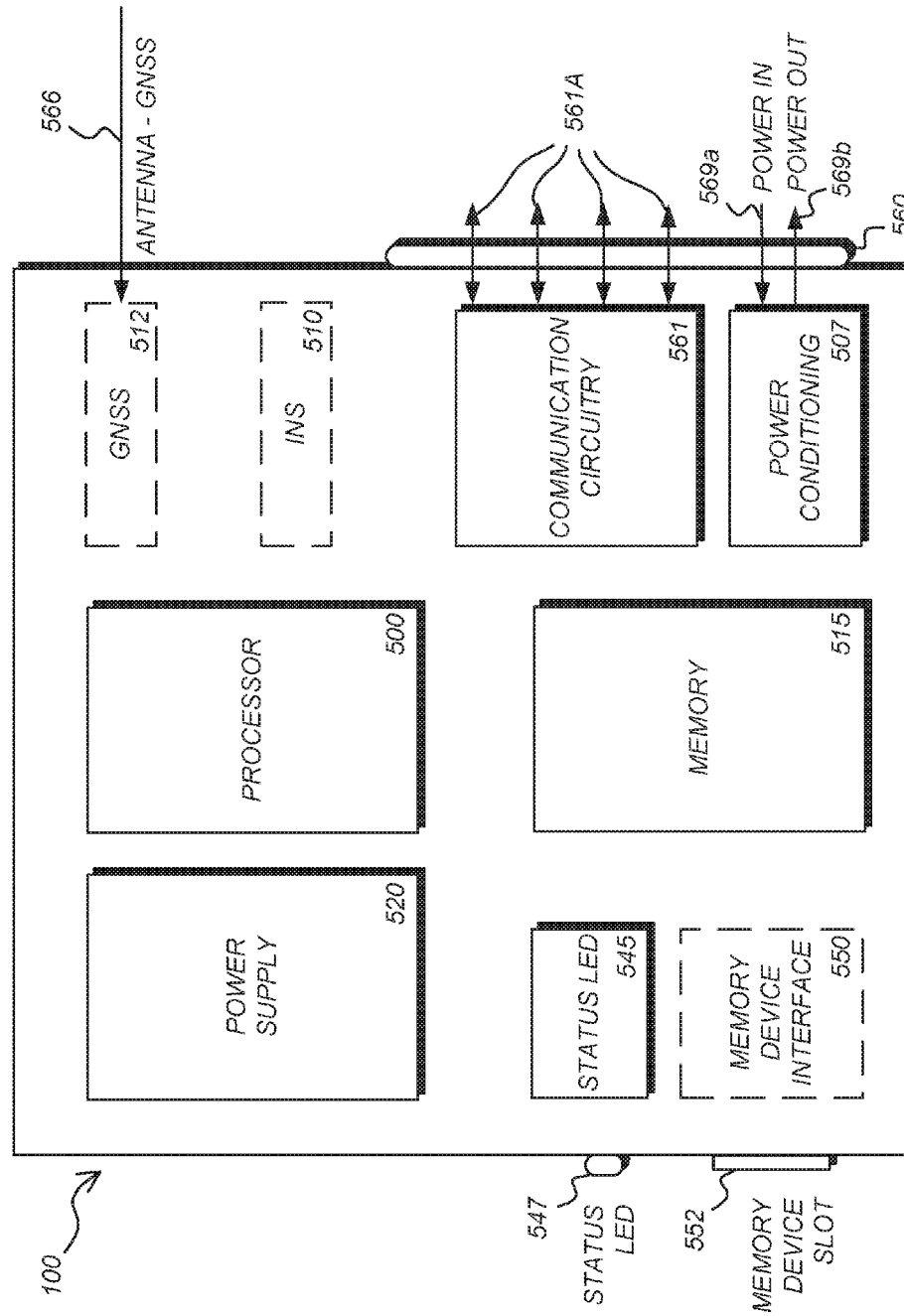

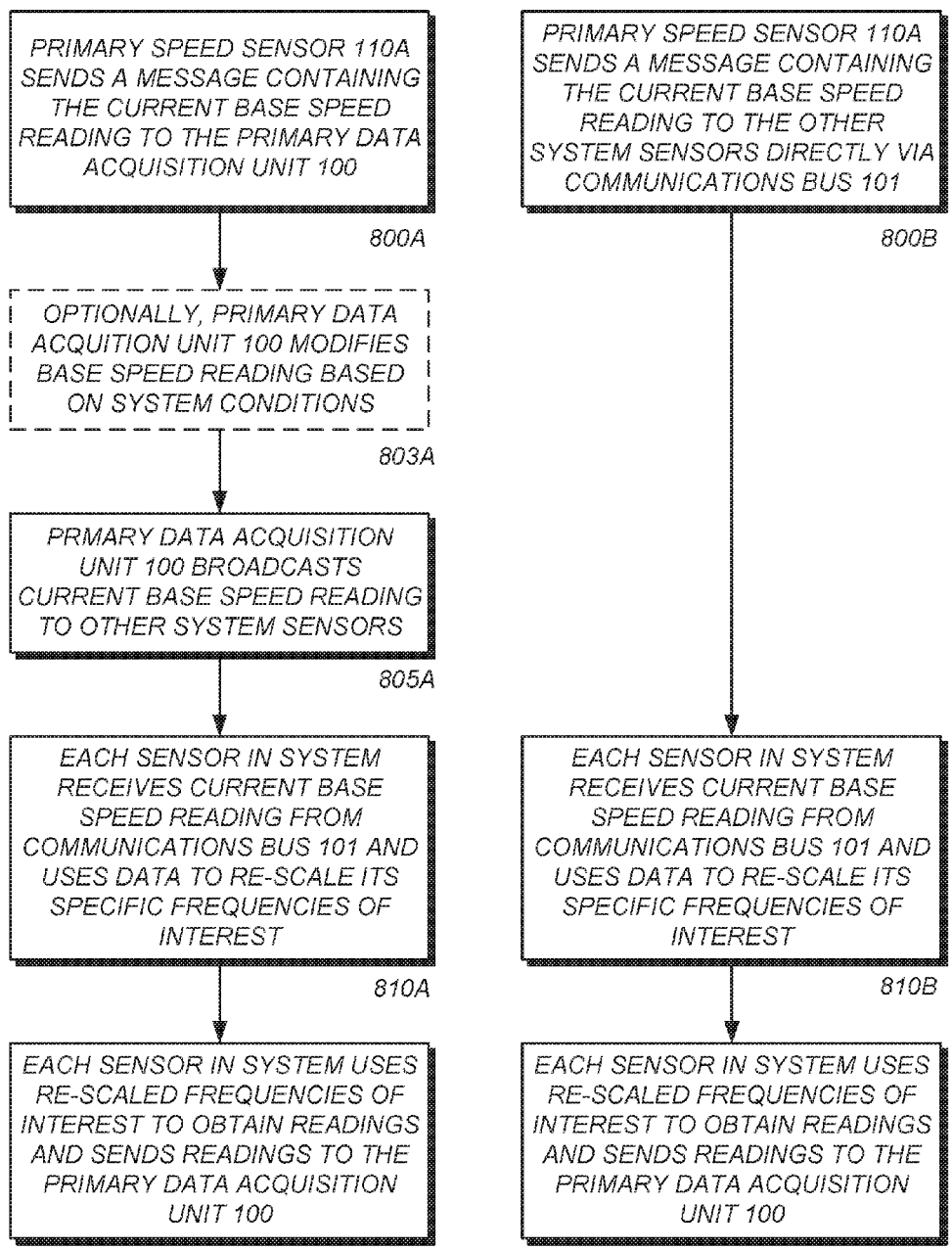

| | | |
|---|---|---|
| MODE 1 | SIMPLE DATA RECORD MODE | DISTRIBUTED INTELLIGENT SENSORS RECORD FREQUENCY DATA AND TRANSMIT THE DATA TO THE PRIMARY DATA ACQUISITION UNIT FOR LATER ANALYSIS AND COMPARISON TO HISTORICAL TREND DATA. |
| MODE 2 | SYSTEM FAULT ALERT MODE | DISTRIBUTED INTELLIGENT SENSORS ANALYZE FREQUENCY DATA LOCALLY IN REAL-TIME AND REPORT FAULTS DETECTED AT THEIR LOCATION VIA A MESSAGE BROADCAST TO THE SYSTEM. IF A FAULT IS DETECTED, A CERTAIN LIMITED AMOUNT OF DIGITIZED DATA PRECEDING THE FAULT EVENT MAY BE BROADCAST FOR SUBSEQUENT ANALYSIS. |
| MODE 3 | ANALOG PASS-THROUGH MODE | DISTRIBUTED INTELLIGENT SENSORS ARE USED TO MIMIC OLDER STYLE SENSORS (SUCH AS PIEZOELECTRIC ANALOG SENSORS) BY SIMPLY DETECTING FREQUENCY DATA AND PASSING IT THROUGH AS AN ANALOG VOLTAGE ON ANALOG OUTPUTS. |
| MODE 4 | DIGITIZED WAVEFORM MODE | DISTRIBUTED INTELLIGENT SENSORS CAPTURE THE ANALOG FREQUENCY WAVEFORMS FROM THE COMPONENT THEY ARE MONITORING AND CONVERT IT TO DIGITAL DATA. THIS DIGITIZED WAVEFORM CAN THEN BE TRANSMITTED BY COMMUNICATION MESSAGE TO OTHER PARTS OF THE SYSTEM OR TO AN EXTERNAL SYSTEM. |

FIG. 9

FREQUENCY-ADAPTABLE STRUCTURAL HEALTH AND USAGE MONITORING SYSTEM

CROSS-REFERENCE TO RELATED APPLICATION

This application claims priority in U.S. Provisional Patent Application Ser. No. 61/597,667, filed Feb. 10, 2012, which is incorporated herein by reference.

BACKGROUND OF THE INVENTION

1. Field of the Invention

The present invention relates generally to the field of structural health monitoring (SHM) for damage detection and characterization of engineered structures, and more specifically to such systems employing a network of distributed intelligent sensors.

2. Description of the Related Art

Structural health monitoring systems (SHMSs) have been developed for many applications, from industrial applications such as monitoring manufacturing lines in paper mills to monitoring the structures and equipment of fixed wing aircraft and rotorcraft. A typical SHMS uses deployed sensors to detect the operational characteristics of various components of a system; such characteristics include the speed, vibration, and temperature of critical components comprising a system. This data is collected and stored by various means for later retrieval and analysis by experts. The experts review the collected data to determine if there are any detectable anomalies which may indicate the necessity for remedial action. Such anomalies, often referred to as "exceedances" because they exceed desired levels or characteristics, may include increasing trends in temperature over time, increasing vibration over time, or other changes in behavior which deviate from an expected baseline. For example, a change in the characteristic frequency of vibration detected from a monitored gearbox may indicate that a mechanical component such as a bearing or gear within the gearbox has failed or is in the process of failing, and therefore the system is in need of maintenance or needs to be replaced.

SHMSs as deployed on aircraft are generally referred to as health and usage monitoring systems, and are often called HUMS.

Rotorcraft such as helicopters are strong candidates for HUMS, as they are highly complex aircraft, and benefit from a HUMS ability to monitor and record engine, gearbox, rotor and other flight critical equipment so as to detect abnormalities which may ultimately effect the airworthiness of the aircraft. HUMS may also be used to monitor other flight critical parameters such as the track and balance of the rotary lift wing of the helicopter or the correct operation of the auxiliary power unit, and can include built-in test and flight data recording (FDR) capabilities.

Overall, a HUMS is intended to acquire, store, and transport data gathered from the various monitored components for further analysis so as to increase the probability that the essential components of the aircraft are operational and defect-free, and therefore that the aircraft is safe for flight. In addition, aircraft owners and operators who employ HUMS often use the information gathered by the system to establish a flight operations quality assurance (FOQA) program based on the data so as to observe trends in aircraft operations and component usage in order to improve the quality of flight operations and hence the overall safety of flight.

There are various types of HUMS which employ different methodologies and sensor types, all of which include the two basic functions of health monitoring and usage monitoring. These functions are described in greater detail below.

Health monitoring refers to the function of observing and recording the operational characteristics of principal machine components or subsystems so as to allow for remedial action should the monitored parameters not lie within a "normal" or "healthy" range. Examples of attributes typically observed and recorded during health monitoring are engine characteristics such as fluid pressures, temperatures, and mechanical vibration; transmission characteristics such as fluid pressures, temperatures, and mechanical vibrations; drive shaft balance, bearing heat and vibration, and rotor track and balance.

Usage monitoring refers to the function of observing and recording the use cases of the principal machine components or subsystems to provide for detection of situations in which the prescribed operational envelope of the component or subsystem has been exceeded. Such exceedances can adversely affect the operational life of a component or subsystem and must be taken into account when forecasting the expected remaining life. In certain situations, an exceedance of a certain magnitude may call for the immediate removal, inspection and possible replacement of a component. Examples of attributes typically observed and recorded in usage monitoring are engine torque, power and exhaust gas temperature, transmission torque and temperature, aircraft gravitational forces and loading, landing shock loads, and aircraft attitude (that is, yaw, pitch and roll angles).

SHMSs taught in prior art consist of various types of sensors mounted at points around a vehicle or equipment installation (typically near rotating components) which generate analog signals proportional to the attribute monitored, a means of transporting the analog signals from the source of generation to a digitizer usually located in close proximity to a data storage unit, a digitizer for converting the analog signals to digital signals, and a control and storage unit which receives the digitized signals and stores them for later analysis. Characteristically, the sensors contain no signal processing capability; they simply generate a temporal analog signal proportional to the attribute monitored. These signals are relayed to a central unit where they are converted to digital data and stored. Each sensor is typically connected directly to the digitizer and storage unit by a dedicated, point-to-point transmission line.

In typical prior art systems, the sensors use a simple means of detecting vibration, such as an accelerometer employing a piezoelectric substance, which detects vibration and converts the frequency and amplitude of the vibration into a very low-current analog voltage signal which is transmitted to the central digitizer and storage unit. These simple analog sensors do not have their own processing power and do not store data for later transmission. Since the sensors have no intelligence (no processing power of their own), they make no determinations relating to the severity or importance of the vibration frequency or amplitude of the signals that they generate. They simply transmit the raw, unprocessed data to a central point for digitization and storage. It is not uncommon for SHMSs of the prior art to contain dozens of such simple analog sensors, including vibration sensors, rotational speed sensors, temperature sensors, and pressure sensors, each with a dedicated transmission line running from the sensor to the system digitizer. As a result of the weak signal strength of many of these sensors, the sensors that are not located very close to the digitizer often require amplification prior to signal transmission so as to insure signal integrity at the digitizer, which adds further cost and complexity to the system.

SHMSs used to monitor aircraft in flight, particularly those systems used to monitor helicopters, face a unique set of challenges. In such systems it is required that the vibrations and torque of certain critical components be analyzed with respect to the actual flight characteristics under which the sensed data was generated. These flight characteristics, such as low speed forward flight, high speed forward flight, low power forward climb, high power forward climb and so on, may each induce different stress characteristics in the critical components which are being monitored. To understand which characteristics are normal and which are not, one needs to know the conditions under which they were generated. For example, what may be considered excessive vibration in straight and level flight may be within acceptable operational range in a high speed climb. Further compounding the problem is that, for data to be useful in comparative analysis, all of the data from a particular event should be taken during a period of time in which the flight dynamics of the aircraft are constant. Such time periods of steady state conditions are known as "points of stationarity." Inasmuch as it is generally impractical to monitor, record, and analyze the massive amounts of data which would be generated by recording all of the data from the multitude of sensors during every moment of an aircraft in a long duration flight, data samples are only taken at predefined points of stationarity. In low cost HUMSs of the prior art, such data acquisition events are manually triggered by the pilot, generally during non-complex flight regimes such as straight and level flight. More complex and expensive systems, which include inertial sensors or which have access to inertial data on a data bus, may trigger recording events automatically when prescribed points of stationarity are detected. This is not as crucial for stationary HUMS, such as those used to record data from the machinery in a paper mill, as it is for HUMS in an aircraft such as a helicopter.

HUMS of the prior art suffer from several distinct disadvantages. Some of these shortcomings are as follows:

Wiring can be expensive, heavy, and fragile. In systems of the prior art, each sensor is wired individually to the digitizing unit, typically using a coaxial cable. The coaxial cables used are both fragile and expensive. Care must be taken in routing the cables not to bend them too sharply or compress them. If the cables are crimped or compressed they can attenuate the signals from the sensors to such a degree that the information transmitted is lost. Given that each sensor must have its own unique cable, rather than, for example, sharing a common data bus, the amount of wiring on a modern aircraft can be substantial, adding unnecessarily to the aircraft's weight.

Manual initiation of system recording can introduce both safety and accuracy concerns. In low cost systems of the prior art, the HUMS recording cycle has to be manually initiated after the pilot has placed the aircraft into a known state of stationarity, such as straight and level flight. Requiring the pilot to take such action increases the risk that the distraction so imposed might, under unique situations, (unanticipated turbulence for example) impair the safe operation of the aircraft. In addition, if the pilot misinterprets the actual flight characteristics of his aircraft (that is, the aircraft is not actually in straight and level flight for the required duration of the measurement) then the data acquired may actually be useless for purposes of aircraft health determination.

Large amounts of analog data acquired necessitate heavy, expensive digitizers and storage equipment. Because the sensors are "dumb" (no processing power), they simply record raw data and send everything over the cables to the control unit, which must then deal with this large amount of potentially rapidly-changing data.

Poor signal quality. Simple analog sensors often require the use of signal amplifiers to avoid attenuation of the signals as they travel from the point of detection to the central control unit.

Lack of adaptability. Existing HUMS cannot automatically adapt to the changing base frequency caused by a change in the base central speed, such as the engine speed of an aircraft as it moves into and through different flight regimes. Airborne systems may only be able to effectively monitor an aircraft in known and controlled flight regimes (such as hovering or on the ground).

Several different approaches to HUMS systems exist in the prior art. U.S. Patent Publication No. 2010/0057277 by Goodrich et al. describes methods and systems for health monitoring for aircraft. Goodrich et al. describes monitoring the health of an aircraft by obtaining vibration data from a series of vibration sensors located on the aircraft, and navigation data from a navigation system (including a GPS receiver and one or more inertial navigation system, or INS, chips) and fusing the two sets of data.

U.S. Pat. No. 8,306,778 by Leao et al. describes a prognostics and health monitoring method for electro-mechanical systems and components which consists, generally, of the steps of (1) collecting performance measurements from a system component while that component is known to be healthy (in good working condition) and while the system is being commanded in response to a predetermined pattern of operation, (2) using these measurements to construct a statistical model of the component or system, (3) collecting new performance measurements from the component while it is being commanded in response to the same predetermined pattern of operation, (4) comparing the new measurements to the statistical model to calculate something called a "degradation index", which indicates a change in performance from the statistical model, and (5) using the trend of the degradation index over time to predict a future failure of the component. Leao appears to be describing a simple closed loop monitoring system.

U.S. Pat. No. 6,289,735 by Dister et al. describes a system and method of vibration analysis. This patent describes receiving vibration signals from a vibration sensor mounted on a machine, and then using a known critical frequency (for example, a critical frequency supplied by a manufacturer for a rotating component) to analyze the amplitude of the vibration signals at several harmonic frequencies calculated from the known critical frequency.

U.S. Pat. No. 6,321,602 by Ben-Ramdhane describes a method of condition-based vibrational analysis wherein the condition of a bearing or shaft assembly is monitored by obtaining a first spectral analysis of the assembly's vibration, and then comparing this baseline spectral analysis to subsequent spectral analyses of assembly vibrations obtained at a later time to determine the condition of the assembly.

U.S. Pat. No. 6,711,952 by Leamy et al. describes a system and method for monitoring bearings that is suited particularly for use in an aircraft gas turbine engine, where mounting a vibration sensor close to the rotating shaft is difficult because of the high temperature environment near the shaft. Instead, Leamy et al. mounts the sensor remotely, proximate to the rotating shaft but not in the high-temperature region. The remote sensor then obtains a broadband signal which contains frequencies that include the "bearing defect peak," and if the peak is detected the amplitude of the peak is quantified to determine if degradation of the monitored bearing has reached a threshold level where imminent failure can be detected and prevented.

None of the systems described above use intelligent sensors (that is, vibration or other HUMS sensors which have a significant amount of processing power integral to their bodies), cannot automatically detect flight regimes, and do not automatically adjust the range of "frequencies of interest" based on a key system frequency signal.

What is needed in the art is a health and usage monitoring system in which the processing power is distributed through the use of intelligent sensors, which can automatically detect when the aircraft has entered into a flight regime for which recording of data is required, and which can automatically adapt to changing key frequencies on the vehicle. When a large vibration amplitude is discovered at one of the harmonic frequencies, that indicates that a resonant frequency of one of the transmission paths from the vibration source to the vibration sensors has been located, and this information can be used to analyze the health of a particular component.

SUMMARY OF THE INVENTION

Throughout this specification, the terms "health and usage monitoring system" and "HUMS" shall be used somewhat interchangeably with the terms "structural health monitoring system" and "SHMS." Typically, a HUMS (health and usage monitoring system) is a more specific example of a SHMS (structural health monitoring system) targeted for use on aircraft or similar systems. However, all of the above terms shall be used throughout the specification to refer to the broader category of structural health monitoring systems, and the use of "HUMS" or "health and usage monitoring system," when used in context with a non-aircraft-based application, shall be assumed to also describe the more general structural health monitoring system.

Also throughout this specification, when a HUMS or SHMS is described as being in use with a vehicle or another specific application, it should be assumed that the system can be applied equally successfully to any "dynamic mechanical system," where the term "dynamic mechanical system" is defined to mean either a mobile system (such as a vehicle) or a stationary system (such as a manufacturing line) which contains rotating, oscillating, reciprocating, or otherwise continuously or periodically moving components. All of the systems described in this specification or in the claims of this application are to be considered dynamic mechanical systems.

According to one aspect of the present invention, a health and usage monitoring system mounted on a dynamic mechanical system, such as a vehicle or a manufacturing line, includes at least one intelligent sensor, a central control module, and a communication network connecting the intelligent sensor and the central control module, wherein the intelligent sensor comprises a signal processor such as a high-end audio signal processor, a software program operating the signal processor, a vibration sensor, and a transceiver for transmitting data to and receiving data from a remote location, wherein the intelligent sensor is mounted near a moving component on the dynamic mechanical system and monitors the operation of the moving component.

According to another aspect of the present invention, a health and usage monitoring system mounted on a dynamic mechanical system includes at least two intelligent sensors, a central control module, and a communication network connecting the intelligent sensors and the central control module, wherein each intelligent sensor is mounted near a different moving component on the dynamic mechanical system and each monitors the performance of the component near which it is mounted, wherein information acquired by one of the intelligent sensors is used to configure the operation of the other intelligent sensor.

According to yet another aspect of the present invention, a health and usage monitoring system mounted on a dynamic mechanical system, includes at least two intelligent sensors, a central control module, and a communication network connecting the intelligent sensors and the central control module, wherein each intelligent sensor is mounted near a different moving component on the dynamic mechanical system and each monitors the performance of the component near which it is mounted, wherein information acquired by a first intelligent sensor is used to configure the operation of the second intelligent sensor, and wherein the information acquired by the first intelligent sensor comprises a digital representation of an operating frequency of the component on the dynamic mechanical system near which it is mounted, and the digital representation is used to derive key system frequencies to which the second intelligent sensor will be configured to monitor.

According to another aspect of the invention, a method for creating a real-time health and usage monitoring system includes the steps of mounting one or more intelligent sensors near operating components of a dynamic mechanical system, such that the intelligent sensors can detect the state of the operating components, connecting the intelligent sensors by a communications network, connecting a central control module to the communications network, loading operational profile information into the central control module, wherein the operational profile information defines an acceptable performance range for each of the operating components, using the intelligent sensors to detect when one or more of the operating components is performing outside its acceptable performance range, and notifying an operator when an operating component has moved outside of its acceptable performance range.

According to yet another aspect of the present invention, an intelligent sensor core comprises a signal processor, a control program executing on the signal processor, a first means of communication for transmitting data to and receiving data from a separate sensing unit, a second means of communication for transmitting data to and receiving data from a remote central control module, and a mounting means, wherein the separate sensing unit may be located remotely from the intelligent sensor core, and wherein the separate sensing unit may be readily replaced with a different sensing unit with different functionality.

According to yet another aspect of the present invention, a health and usage monitoring system is configured to operate in one of several pre-defined operational modes, such that the health and usage monitoring system can be used on older dynamic mechanical systems without needing to change or upgrade pre-existing maintenance tools and/or system components.

BRIEF DESCRIPTION OF THE DRAWINGS

FIG. 1A shows a block diagram of one embodiment of a health and usage monitoring system designed for use with rotorcraft.

FIG. 4A shows an embodiment of a package design for an intelligent sensor which can be bolted to a flat surface.

FIG. 4B shows an embodiment of a package design for an intelligent sensor which can be mounted underneath a bolt.

FIG. 4C shows an embodiment of a threaded package design for an intelligent sensor which can be screwed into a plate for mounting.

FIG. 5 shows a block diagram of a data acquisition unit for use in a health and usage monitoring system.

FIG. 8A is a flowchart showing how a health and usage monitoring system uses communication between a network of intelligent sensors and a primary data acquisition unit to calculate frequencies of interest to which the intelligent sensors are tuned to monitor.

FIG. 8B is a flowchart showing an alternate method to that of FIG. 8A for how a health and usage monitoring system uses communication directly among intelligent, networked sensors to calculate frequencies of interest to which the intelligent sensors are tuned to monitor.

FIG. 9 shows a table presenting four possible modes of operation for the frequency-adaptable health and usage monitoring system presented herein.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning. The invention can be fabricated in various sizes and configurations from a wide variety of suitable materials and components, which are chosen for their characteristics according to the intended use and the operation of the invention.

II. Health and Usage Monitoring System

With reference now to the drawings, and in particular to FIGS. 1 through 9 thereof, a new frequency-adaptable health and usage monitoring system embodying the principles and concepts of the present invention will be described.

Figure 1:
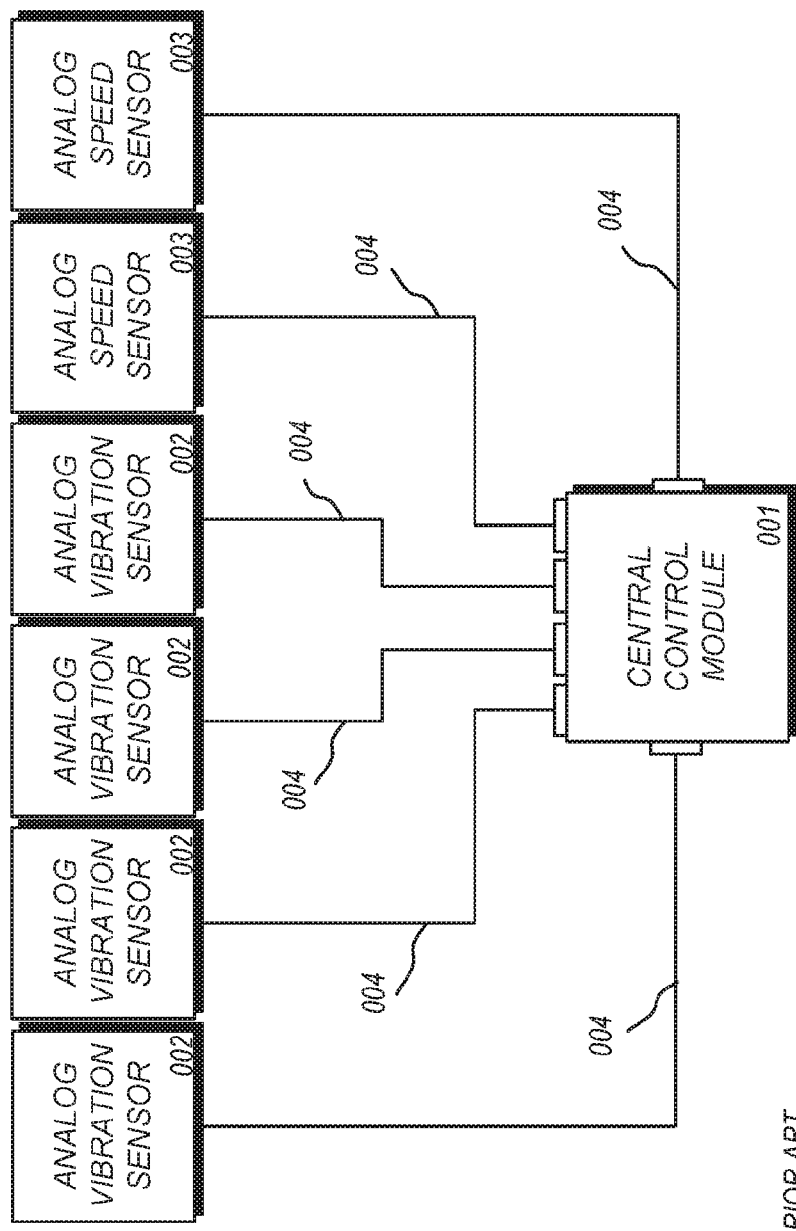
FIG. 1 shows a block diagram of a typical health and usage monitoring system that exists in the prior art.

FIG. 1 shows a block diagram of a typical health and usage monitoring system that exists in the prior art. As previously summarized in the background section, HUMSs found in the prior art consist of several analog sensors, including analog vibration sensors 002 and analog speed sensors 003, mounted at points around a vehicle or application and a central control module 001, which receives raw data from the analog vibration sensors 002 and analog speed sensors 003 and stores it for later analysis. The analog sensors 002 and 003 have no processing power and simply report raw data to the central control module 001, which stores the data for later analysis. Each analog sensor 002 and 003 is typically hard-wired directly to the central control module 001 by a coaxial cable 004 or other bulky wire harness. These simple analog sensors 002 and 003 do not have their own processing power and do not store data for later transmission. They simply send their raw, unprocessed data to the central control module 001 for collection. Since the analog sensors 002 and 003 have no processing power themselves, these prior art systems typically rely on operator initiation, since the operator, not the sensors, must determine when the vehicle is in a known flight regime, such as hovering, before the data collection can be started. Additional detail on these prior art systems is provided in the background section.

FIG. 1A shows a block diagram of one embodiment of a health and usage monitoring system designed for use with rotorcraft. The block diagram is meant to be illustrative, depicting one possible embodiment of the invention, and is not intended to be limiting in any way. The sensors depicted in the diagram are representative of a possible subset of sensors. Sensors and other components may be added, removed, or replaced in this diagram without altering the inventive concept as described herein.

A primary data acquisition unit 100 is installed in a rotorcraft. The primary data acquisition unit 100 is connected to a first set of sensors via a communications bus 101 such as a CAN (Controller Area Network) bus or any other appropriate communications bus or means. The primary data acquisition unit 100 can send messages to and receive messages from the first set of sensors via the communications bus 101. Sensors typical of those that would be found in the embodiment shown in FIG. 1A may include a transmission input vibration sensor 105, a transmission input speed sensor 110 (sometimes referred to as N2 in rotorcraft), a transmission output vibration sensor 115, a gearbox vibration sensor 120, a compressor vibration sensor 125, a blower motor hanger bearing vibration sensor 130, a tail rotor gearbox vibration sensor 135, a cabin vertical vibration sensor 140, a cabin horizontal vibration sensor 145, a gearbox rotation speed sensor 150 (sometimes referred to as N1 in rotorcraft), and other sensors 137 as required. The specific sensors shown in FIG. 1A are exemplary of the types of sensors that might be found on a HUMS system on a rotorcraft, and are not meant to be limiting in any way.

Sensors in this first set fall into two primary categories: vibration sensors and speed sensors. Vibrations sensors are used to sense the linear accelerations in one or more dimensions caused by moving and rotating components. Typical technologies for vibration sensors include MEMS accelerometers, which are surface micro-machined capacitive sensors, and piezoelectric sensors, which turn the mechanical movements and deformation of a crystal or membrane into electrical signals. Example embodiments of both speed and vibration sensors as used in the present invention are provided in FIGS. 2A, 2B, and 2C, and an intelligent sensor core which can be used to convert non-intelligent sensors for use in the present invention is shown in FIG. 3. These figures will be discussed later in this specification.

A second set of sensors may be connected as direct hard-wired inputs 102 to the primary data acquisition unit 100. These sensors typically include, but are not limited to, a GNSS (Global Navigation Satellite System) antenna 155, an outside air temperature sensor 160, a pitot pressure sensor 165, a static pressure sensor 170, and a torque pressure sensor 175. The sensors in this second set are typically not vibration and speed sensors, as discussed above for the first set of sensors, but rely on other sensor technologies to provide environmental data.

One or more optional additional data acquisition units 180 may be connected via a communications link 103 to the primary data acquisition unit 100 in order to expand the capabilities and coverage of the HUMS. The communications link 103 may be any appropriate means of connecting the optional additional data acquisition units 180 to the primary data acquisition unit 100, including but not limited to a serial communications interface such as an RS232 or USB connection, a communications bus such as a CAN bus, a wireless connection, or any other appropriate means for connecting the two units.

Other sensors 137 may be connected to optional additional data acquisition units 180 via a connection means 104. Connection means 104 may be a communications bus 101, a direct wired connection 102, or any other appropriate means for connecting the other sensors 137 to the optional additional data acquisition units 180.

Both the primary data acquisition unit 100 and the one or more optional additional data acquisition units 180 have power 185 and ground 190 connections. The optional additional data acquisition units 180 may be identical to the primary data acquisition unit 100, or may be variations which contain a subset or a superset of the capabilities of the primary data acquisition unit 100. For instance, an optional additional data acquisition unit 180 may have a less powerful processor than the primary data acquisition unit 100, and its primary purpose may be to gather data from other sensors 137 and forward the data to the primary data acquisition unit 100 for final processing.

Figure 1B:
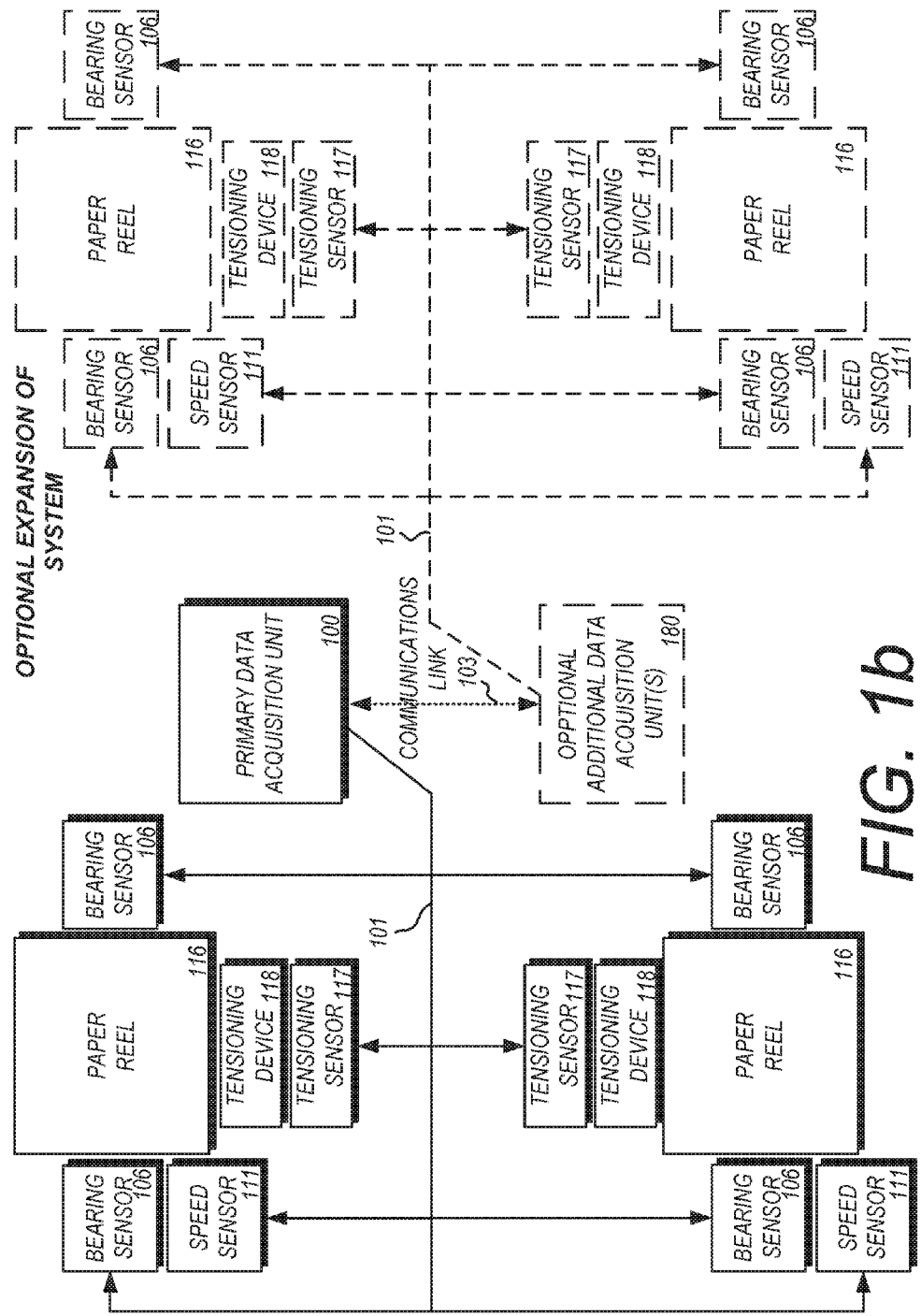
FIG. 1B shows a block diagram of an alternate embodiment of a health and usage monitoring system designed for use on equipment in a paper mill.

FIG. 1B shows a block diagram of an alternate embodiment of a health and usage monitoring system designed for use on equipment in a paper mill. A paper mill consists of a series of large rolls through which sheets of paper are formed, pressed, dried, and smoothed. These rolls can contain large, heavy spools of paper and run at high rates of speed. A roll spins on a set of roller bearings, and paper may be fed over a tensioning arm as it moves through the rolls, which will move back and forth as needed to keep the tension of the paper constant. The failure of a bearing or a tensioning arm can be a catastrophic event for a paper mill. Since all of the rolls in the paper mill spin at the same speed (or are geared to a consistent ratio with the same speed), if a bearing locks up or slows down, the entire line may fail. A HUMS system can be used to detect the impending failure of a component and alert an operator to the problem before it occurs.

A primary data acquisition unit 100 is placed in a central location in the paper mill. It is connected via a communications bus 101 to a series of sensors which may include but are not limited to bearing sensors 106, speed sensors 111, and tensioning sensors 117, which are mounted on or near the paper reels 116 in the paper mill and tensioning devices 118. The bearing sensors 106 may be an intelligent vibration sensor such as that described in FIG. 2A and FIG. 2B, or any appropriate sensor technology that can monitor vibration frequencies and send the data over the communications bus 101. The speed sensors 111 maybe be an intelligent speed sensor such as that shown in FIG. 2C, or any appropriate sensor technology that can detect the rotational speed of the paper reels and send the data over the communications bus 101. The tensioning sensor 117 may be a bearing sensor 106 or a speed sensor 111 (to monitor the bearings and/or speed of the tensioning device 118) or may be an alternate type of sensor. For example, the tensioning sensor 117 may be a position sensor which monitors the angular position of the tensioning device 118, or a hydraulic pressure sensor to monitor the pressure of any hydraulic components that may be present on the tensioning device 118.

The primary data acquisition unit 100 can monitor the speed of each paper reel 116 by receiving speed information via the communications bus 101 from the speed sensors 111. It is possible for the primary data acquisition unit 100 to select one of the system's speed sensors 111 as the "master" speed sensor, and to use the speed communicated by the master speed sensor to tell the bearing sensors 106 in the system what frequencies they should be monitoring. The primary data acquisition unit 100 can also compare speeds from different parts of the system (as received from different speed sensors 111 or from tensioning sensors 117) to see if one of the paper reels 116 or tensioning devices 118 is traveling at a significantly different speed than the others.

One or more optional additional data acquisition units 180 can be connected to the primary data acquisition unit 100 via a communications link 103. This may be done to expand the coverage of the system. The additional optional data acquisition units 180 may be connected to their own set of bearing sensors 106, speed sensors 111, and tensioning sensors 117, as well as any number of other types of sensor devices. Any number of additional optional data acquisition units 180 may be added in this fashion to expand the size and functionality of the system.

The types of sensors shown in FIG. 1B are intended to be exemplary, and not limiting in any way. It would be obvious to one skilled in the arts that any number of intelligent sensors and non-intelligent sensors could be deployed through a paper mill to monitor various types of equipment, and that these sensors could provide other types of information to the primary data acquisition unit 100 without changing the inventive concept presented herein.

Figure 1C:
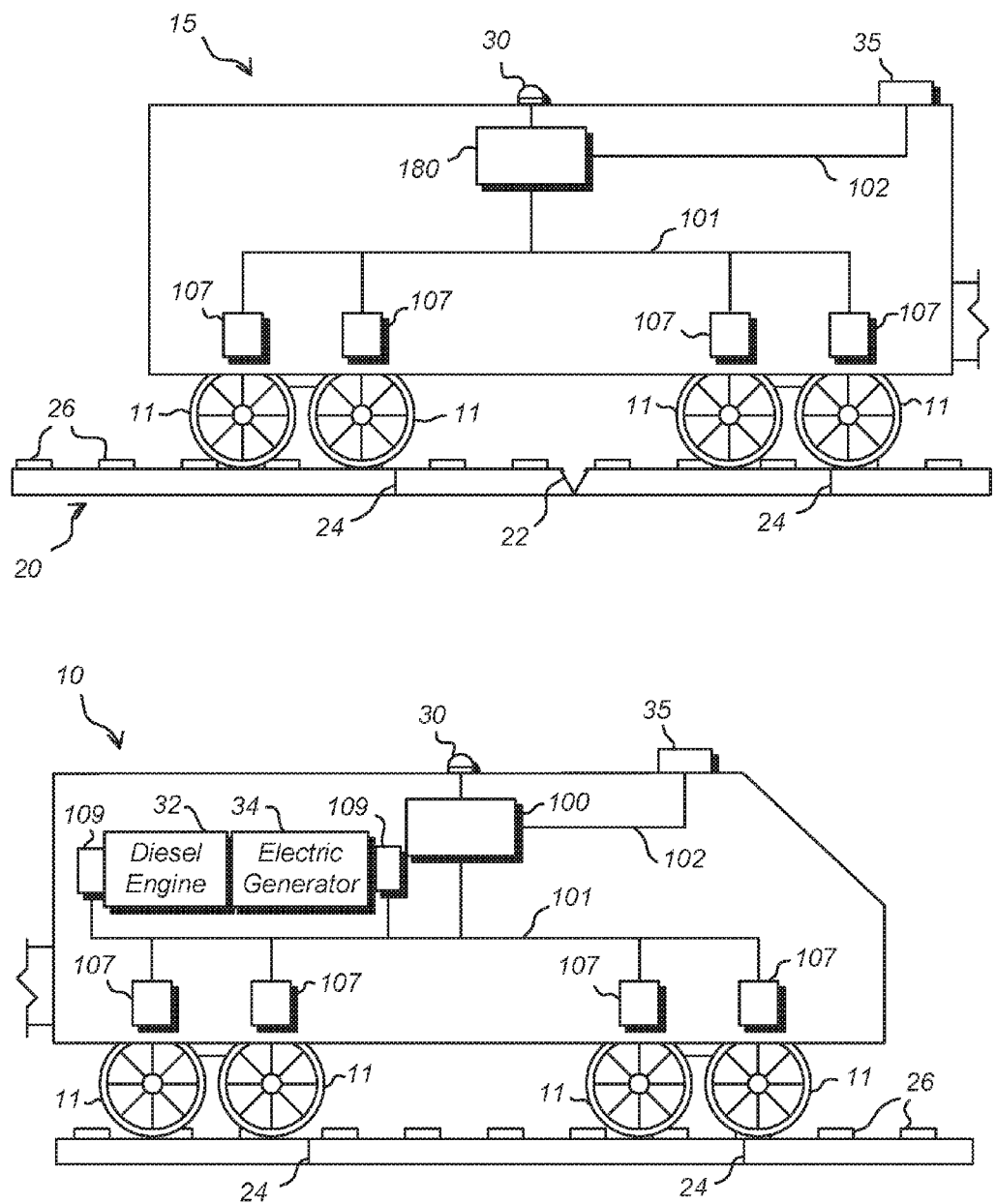
FIG. 1C shows a block diagram of an alternate embodiment of a health and usage monitoring system designed for use on a train.

FIG. 1C shows a block diagram of an alternate embodiment of a health and usage monitoring system designed for use on a train. Shown is a representation of a train featuring a locomotive engine 10 pulling a railroad car 15. The railroad car 15 is meant to be representative of any number of railroad cars that may be in a train, with each car in the train being fitted identically to railroad car 15. In an alternate embodiment of the system, only select railroad cars may be fitted with the devices shown to limit the overall system cost or complexity.

The train represented by locomotive engine 10 and railroad car 15 travels on a railroad track 20. Wheels 11 of the train come in direct contact with railroad track 20. The railroad track 20 is segmented with periodic join seams 24 where two rail segments come together. Railroad ties 26 stretch between the two rails of the railroad track 20 and join them together. Occasionally, an unexpected break in the rail or aberration 22 may occur in the railroad track 20, creating a dangerous condition for the train.

A version of the HUMS shown in FIG. 1A is installed on the train. On the locomotive engine 10, a primary data acquisition unit 100 communicates via a communications bus 101 with a suite of intelligent sensors 107. The intelligent sensors 107 depicted in FIG. 1C are intended to be representative of any of the intelligent sensors described herein, or any other appropriate sensor type. The primary task of the intelligent sensors 107 is to monitor the vibration frequencies at or near the location of the wheels 11. This could be done using a vibration sensor, such as that described in FIG. 2A or FIG. 2B. Alternately this could be done with a sensor using an acoustic technology, such as a microphone or a piezoelectric membrane.

As the wheels 11 of the train move over the railroad track 20, variations in sound and vibration are caused as the wheels move over join seams 24, railroad ties 26, and aberrations 22 in the railroad track 20. Variations caused by join seams 24 and railroad ties 26 are typically spaced evenly and periodic in nature, making them predictable. As the train increases or decreases in speed, these periodic variations in vibrations will increase and decrease correspondingly.

As the train moves over the railroad track 20, the intelligent sensors 107 detect vibrations caused by the movement. The intelligent sensors 107 gather the vibration data and process it according to their mode of operation, or how they have been configured by the primary data acquisition unit 100. The intelligent sensors 107 can send the data to the primary data acquisition unit 100 via the communications bus 101. The primary data acquisition unit 100 gathers the data from multiple sensors 107 and may perform further processing on it before storing the data for later collection. Alternately, the data gathered can be sent from the primary data acquisition unit 100 to a wireless transmitter 35 via a direct connection 102 for transmission off-board to a remote location.

The system on the locomotive engine 10 may require access to a source of speed information. This information is required so that it can be communicated to the intelligent sensors 107. The intelligent sensors 107 receive the current speed of the train via a message on the communications bus 101 and use the information to calculate the target frequencies to which they should be listening. This behavior is further defined in FIGS. 8A and 8B. One possible embodiment for the speed source is to calculate speed based on position readings from the GNSS receiver 512 (from FIG. 5) built into the primary data acquisition unit 100. An optional GNSS antenna 30 may be mounted on the locomotive engine to aid in the reception of the GNSS signal. Another embodiment of the speed source is a stand-alone speed sensor which transmits speed data directly to the primary data acquisition unit 100.

In addition to monitoring data received from the intelligent sensors 107, the embodiment of the HUMS shown in FIG. 1C may monitor the performance of the diesel engine 32 and electrical generator 34, as well as any number of other onboard subsystems. System sensors 109 would be mounted as appropriate to the components of the onboard subsystems, and would communicate data sensed from the components of the electrical and locomotive subsystems of the train to the primary data acquisition unit 100 over the communications bus 101. The system sensors 109 may be any appropriate type of sensor used for sensing the status of an onboard component, and may include temperature sensors, pressure sensors, position sensors, speed sensors, and vibration sensors. In the preferred embodiment, the system sensors 109 are intelligent sensors capable of communicating to the primary data acquisition unit 100 over the communications bus 101. In an alternate embodiment, the system sensors 109 may be non-intelligent sensors that are direct-wired as inputs to the primary data acquisition unit 100. In yet another embodiment of the system, the system sensors 109 are non-intelligent sensors that are combined with an intelligent sensor core such as the one shown in FIG. 3, in which the intelligent sensor core adds communications and processing capability to the otherwise non-intelligent sensor, allowing it to communicate via messages on the communications bus 101.

The system placed on railroad car 15 may be identical to that on the locomotive engine 10, or the primary data acquisition unit 100 may be replaced with an additional data acquisition unit 180. The primary data acquisition unit 100 and the additional data acquisition unit 180 may be more or less identical units, but the primary data acquisition unit 100 on the locomotive engine 10 may act as the primary controlling module of the entire train system. Data collected by the additional data acquisition units 180 in each railroad car 15 would be wirelessly transmitted to the primary data acquisition unit 100 on the locomotive engine 10, which would process and store the collected data accordingly. Alternately, the data collected by each additional data acquisition units 180 in each railroad car 15 may be processed and stored locally by each additional data acquisition unit 180, and off-loaded later for comparison and combination with data collected from the locomotive engine 10 and other railroad cars 15.

One use of the HUMS as shown in FIG. 1C is the monitoring of the condition of the railroad track 20. As the train moves over a track aberration 22, the wheels 11 will create a periodic sound or vibration that is out of the normal periodic sounds of the railroad track 20. Since the primary data acquisition unit 100 has a GNSS receiver 512, the location of each wheel 11 as it moves over the track 20 can be recorded, providing a precise location of the aberration 22 as detected by multiple intelligent sensors 107.

In addition to listening to the track frequencies, the HUMS on a train can monitor the wheels 11 and the axles to which they are mounted. Changes in the periodic sounds and vibration levels detected by the intelligent sensors 107 may indicate a failure in a wheel 11 or in the axle itself. This data can be collected by the primary data acquisition unit 100 and communicated to the operator or an off-board monitoring station to alert of an impending failure.

Of course, there are variations on the system shown in FIG. 1C that can be made without changing the inventive concept. For example, data may be transmitted from one car to another (including the locomotive engine 10) via direct wired connection instead of wirelessly. It may also be possible to omit the additional data acquisition unit 180 in the railroad cars 15 and instead have the intelligent sensors 107 directly transmit their data to the primary data acquisition unit 100 in the locomotive engine 10. The primary data acquisition unit 100 may be located in a different location than the locomotive engine 10, perhaps in a more centrally located railroad car 15 in the middle of the train, or at the rear of the train.

Key to the functioning of the HUMS of the present invention is the use of a distributed network of intelligent sensors. Each sensor in the system has built-in processing power, as well as the ability to communicate with other sensors and modules in the system. The values detected by the sensors in one part of the system can be communicated to sensors or modules in another part of the system and used to configure or coordinate the operation of all sensors in the system.

Figure 2A:
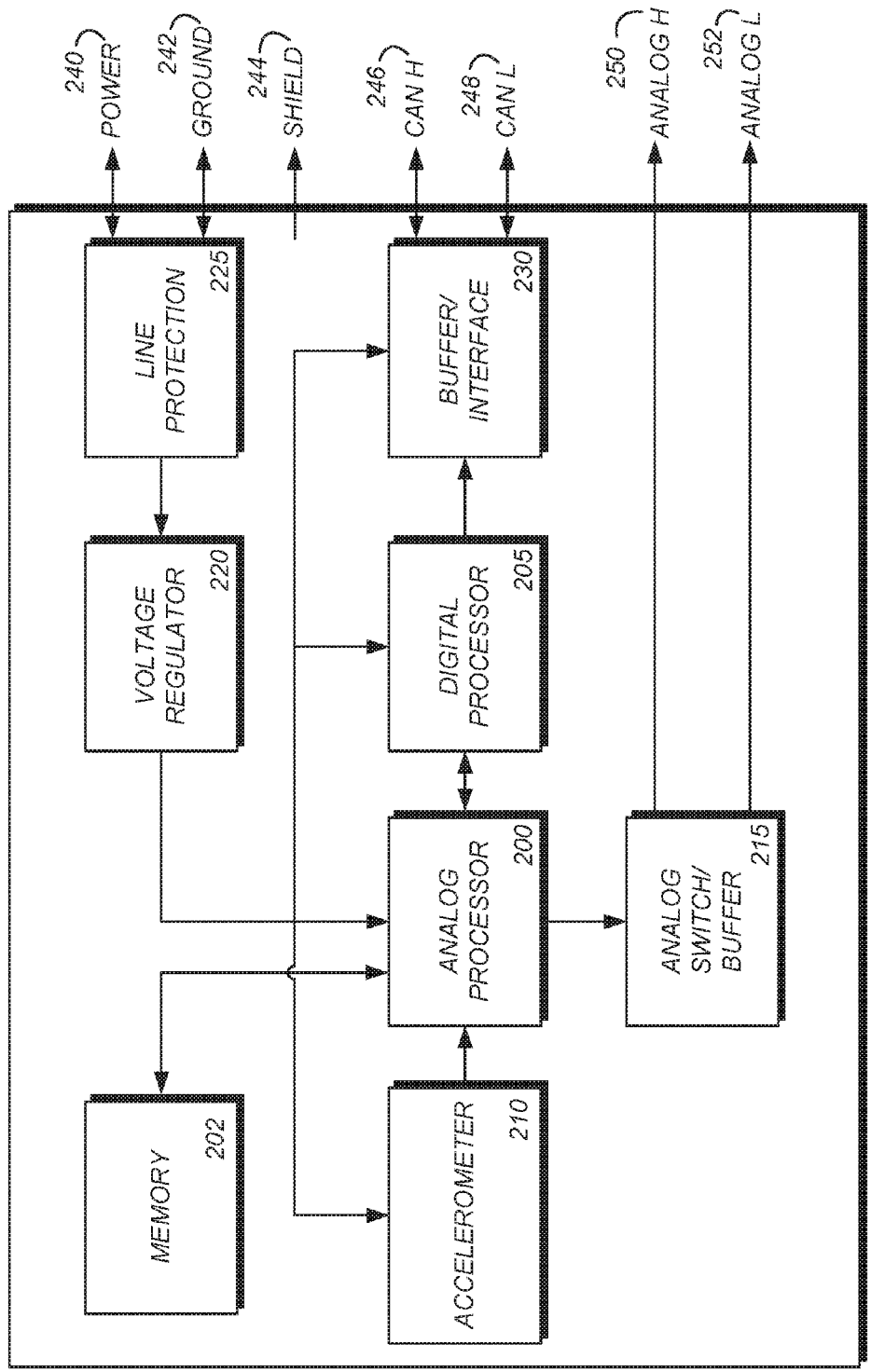
FIG. 2A shows a block diagram of an intelligent, single-axis vibration sensor for use in a health and usage monitoring system.
Figure 3:
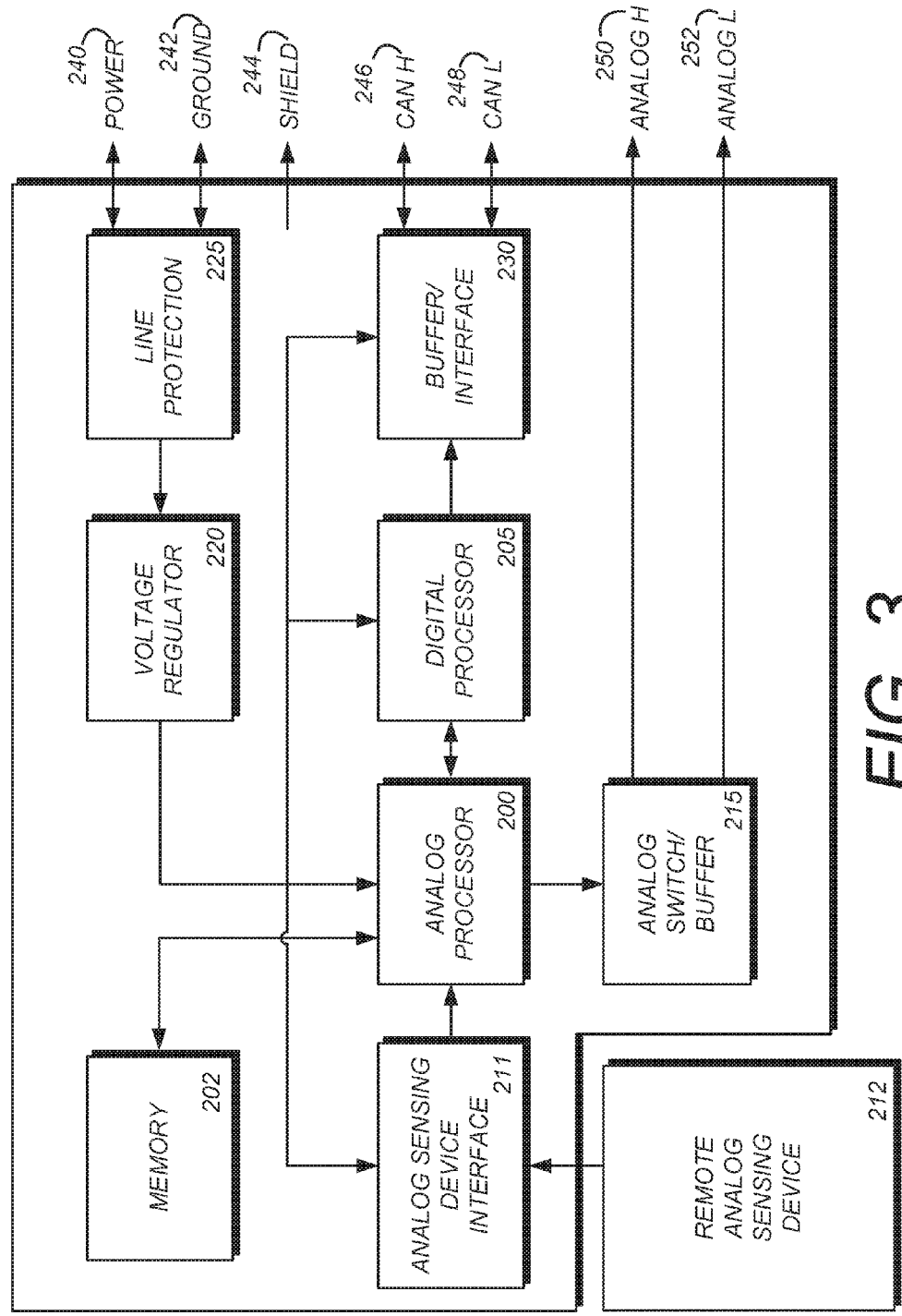
FIG. 3 shows a block diagram of an intelligent sensor core for use in a health and usage monitoring system.

FIG. 2A shows a block diagram of an intelligent, single-axis vibration sensor for use in a health and usage monitoring system, which is one possible embodiment of an intelligent sensor for use in the present invention. An accelerometer 210 detects linear accelerations primarily in the axis in which they are mounted. In the preferred embodiment, the accelerometer 210 is a MEMS surface micromachined capacitive sensor, but any appropriate accelerometer technology can be used.

An analog processor 200 receives the signal generated by the accelerometer 210. The preferred embodiment of the analog processor 200 is a high-end audio frequency processor, such as the ADAU1401A distributed by Analog Devices. The ADAU1401A is a complete, single-chip audio system with an audio digital signal processor, analog-to-digital converters, digital-to-analog converters, and microcontroller-like control interfaces. Signal processing includes equalization, cross-over, bass enhancement, multiband dynamics processing, delay compensation, speaker compensation, and stereo image widening. This processing capability, designed for processing audio signals on studio mixing boards and similar applications, is ideally suited for processing the frequency-based vibration and speed data from the intelligent sensors.

The ADAU1401A audio frequency processor is one example of an audio signal processor that could be used. Any appropriate audio processor or similarly capable microprocessor would be an appropriate substitute without changing the inventive concept.

The analog processor 200 stores the information it collects from the accelerometer 210 in memory 202. Memory 202 may also be used to store configuration information that determines how the vibration sensor should operate, as well as other information.

A digital processor 205 receives vibration data from the analog processor 200. The primary purpose of the digital processor 205 is to collect and digitize information received from the analog processor 200 and to prepare this information for transmittal, as well as to receive and process information coming into the sensor from the communications bus 101 (from FIG. 1A). A communications buffer/interface 230 collects the message data from the digital processor 205 as well as incoming messages from the communications bus 101. A communications high line 246 and communications low line 248 provide a connection between the buffer/interface 230 and the communications bus 101. An example embodiment of the communication lines 246 and 248 would be that specified by the CAN (Controller Area Network) standard physical layer specification, but any appropriate communications standard or physical layer implementation can be used. Some communication protocols require a shield 244 to reduce the effects of external radio frequency (RF) noise on the quality of the signal.

The analog processor 200 is also connected to an analog switch/buffer 215. The analog switch/buffer 215 can be used by the intelligent sensor in a "pass-through" mode, in which analog data taken from the accelerometer 210 is passed from the analog processor 200 into the analog switch/buffer 215 for direct transmission to the outside world via an analog high line 250 and an analog low line 252. This "pass-through" mode allows the intelligent sensor to emulate a non-intelligent sensor in which raw analog data from the accelerometer 210 is passed out of the sensor without any processing. This mode may be required to allow an interface to existing ground-based tool sets used by maintenance workers, which were designed for use with simple accelerometers which do not possess their own processing capabilities.

Power wire 240 and ground wire 242 bring power into the intelligent sensor. This power is conditioned by line protection circuitry 225 to prevent voltage spikes and transients from harming internal electronics, and by a voltage regulator 220 which ensures a steady input voltage source for the electronics.

Figure 2B:
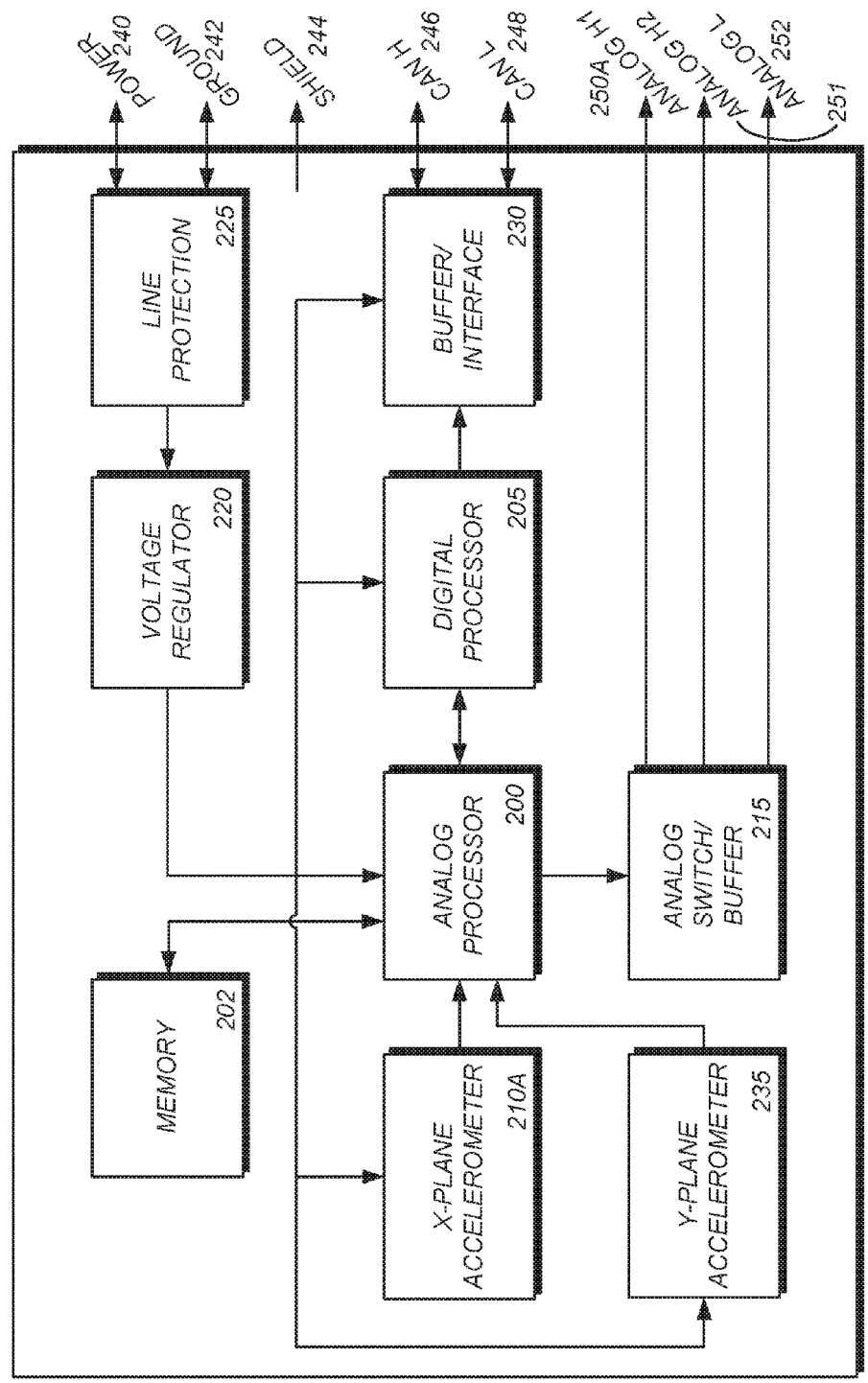
FIG. 2B shows a block diagram of an intelligent, dual-axis vibration sensor for use in a health and usage monitoring system.

FIG. 2B shows a block diagram of an intelligent, dual-axis vibration sensor for use in a health and usage monitoring system. The dual-axis vibration sensor is largely identical in function and composition to the single-axis vibration sensor of FIG. 2A, but contains a second accelerometer. The first accelerometer 210A is mounted in the x plane, and the second accelerometer 235 is mounted in the y plane. For the purposes of this specification, the terms "x plane" and "y plane" shall be used to define two imaginary planes that are rotated with regard to each other so that they are 90 degrees out of phase. For example, the floor of an enclosure containing the vibration sensor may be considered the x plane, and the wall of the enclosure that is perpendicular to the floor may be considered the y plane. The assignment of the x plane and y plane, however, is arbitrary, and the important fact is that the two planes are perpendicular to each other.

Providing two accelerometers separated by 90 degrees allows the vibration sensor to sense linear accelerations in two directions. This two-axis sensor provides additional information beyond that of the single-axis sensor. An alternate embodiment of this sensor could be made by adding a third accelerometer in a "z plane" which is a plane that is 90 degrees to both the x plane and the y plane previously described, allowing the measurement of linear accelerations in three axes of movement.

Additional changes from the single-axis vibration sensor of FIG. 2A and the dual-axis vibration sensor of FIG. 2B are the addition of an analog output to handle the second accelerometer. Analog H1 250A is used to output the raw analog data from x-plane accelerometer 210A, and analog H2 251 is used to output the raw analog data from y-plane accelerometer 235. An analog low line 252 provides a common low output line for both analog H1 250A and analog H2 251.

Beside the addition of a second accelerometer and the corresponding analog outputs required to output the signal of this added accelerometer, the dual-axis vibration sensor is identical to the single-axis vibration sensor.

The following paragraphs describe a typical operational scenario for a vibration sensor of the types shown in FIGS. 2A and 2B. These paragraphs describe one embodiment of such a vibration sensor, and are not intended to be limiting in any way.

III. Typical Embodiment of Vibration Sensor Operation

A vibration sensor is preconfigured with the ratio, G, between its own angular velocity, V, and that of the reference speed sensor. The vibration sensor is preconfigured with a set of frequencies of interest, RFx, relative to its corresponding rotational component, so that:

a. For shafts:
RF1=1, and
RF2=2
b. For gears:
RF3=the number of gear teeth, and
RF4=2*the number of gear teeth, and
RF5=the number of gear teeth−1, and
RF6=the number of gear teeth+1
c. For bearings:
RF7=the relative ball pass frequency of the outer race
RF8=the relative ball pass frequency of the inner race
RF9=the relative ball spin frequency The analog vibration signal is sampled by an analog-to-digital converter (ADC) at rate $F_s > 2*V*G*RFxMax$, in which RFxMax is the highest relative frequency applicable to the corresponding rotational (reference speed) component.

The vibration amplitude for a given region of interest is given by either

Band pass filtering:
The sampled signal is filtered by band pass filter Hx
The absolute normalized frequency, ANFx, for a given relative frequency of interest, RFx, is defined as ANFx=2*V*G*RFx/Fx
The pass band of Hx is centered around ANFx
The amplitude, Ax, equals the RMS of the Hx output signal buffer of length V*G*Fs Or by frequency transformation:
The sampled signal of duration equal to one rotation, given by V*G*Fs, is buffered
A Discrete Fourier Transform (DFT) is performed using the Fast Fourier Transform (FFT) algorithm, or other
The absolute discrete frequency, ADFx, of a given relative frequency of interest, RFx, is defined as ADFx=V*G*RFx
The amplitude, Ax, of a given ADFx is given by extracting the absolute value of the ADFx'th element of the DFT buffer For each Ax, the sensor broadcasts on the bus the output of a smoothing filter of preconfigured length, L, for which the input is Ax.

Figure 2C:
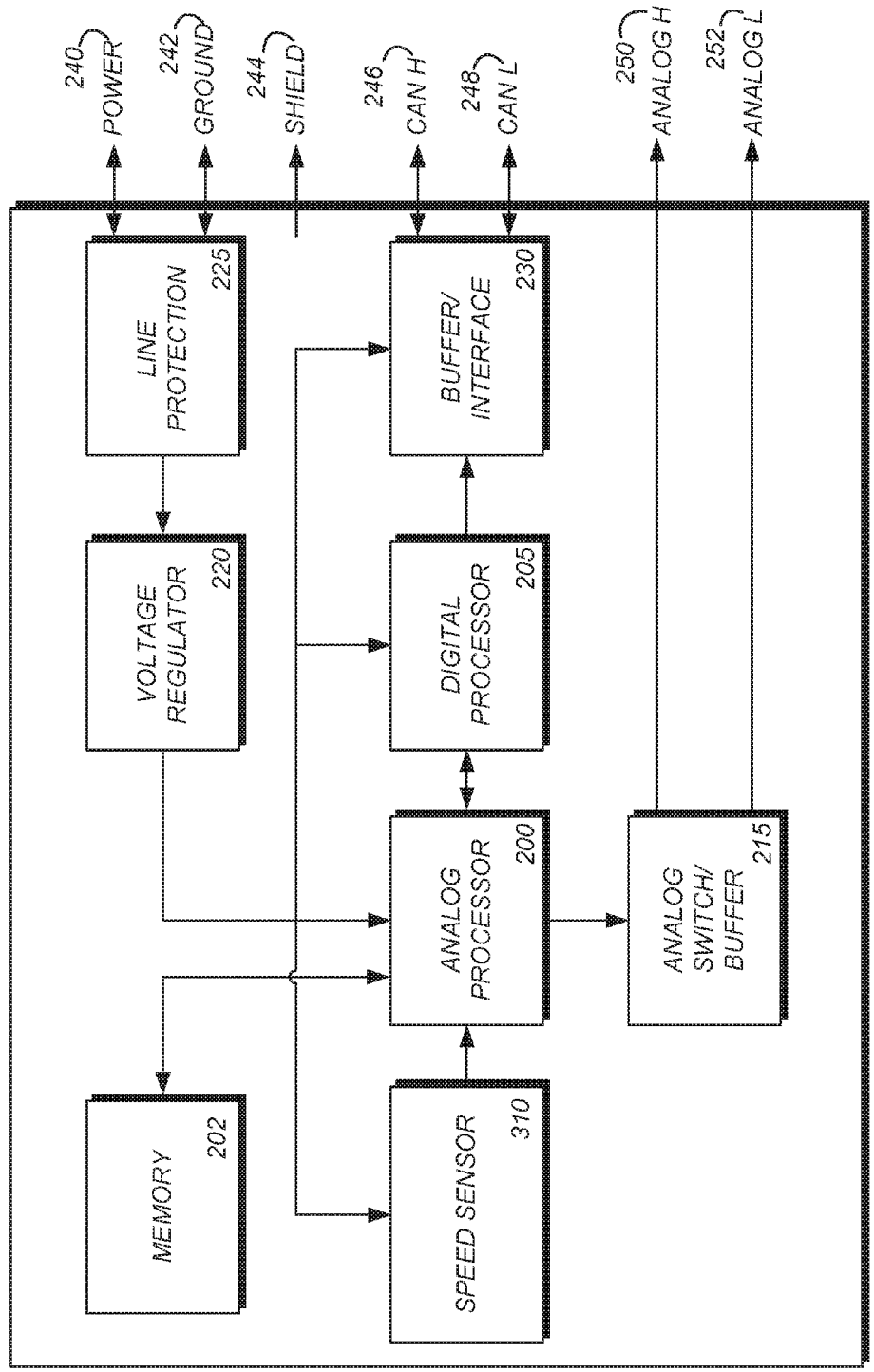
FIG. 2C shows a block diagram of an intelligent speed sensor for use in a health and usage monitoring system.

FIG. 2C shows a block diagram of an intelligent speed sensor for use in a health and usage monitoring system. The intelligent speed sensor uses essentially the same core architecture as the vibration sensors of FIGS. 2A and 2B, but replaces the accelerometer sensing device with a speed sensor 310.

Various technologies can be used to implement a speed sensor 310. One such technology is a Hall Effect sensor, in which a magnet or magnetic field can be used to detect the presence of a ferrous metal component (such as a gear tooth). The Hall Effect is a phenomenon known to those skilled in the art whereby an electrical conductor varies its output voltage in response to changes in a magnetic field. Another technology for use in a speed sensor is variable reluctance, wherein a ferrous metal component passing by a magnet will induce a change in the magnetic flux passing through the magnet, and subsequently inducing a change in voltage in an attached pickup coil. A third type of technology for use in a speed sensor is an optical sensor. An optical sensor consists of a light sensor which detects variations in incident light when an object passes between the light sensor and a co-located light source. The above-mentioned technologies are possible embodiments, but any appropriate technology for a use in a speed sensor can be used to implement the intelligent speed sensor.

Other than the use of a speed sensor 310 as the sensing means, the intelligent speed sensor of FIG. 2C is based on the same functional blocks as the vibration sensor of FIG. 2A.

The following paragraphs describe a typical operational scenario for a speed sensor of the type shown in FIG. 2C. These paragraphs describe one embodiment of a speed sensor based on a Hall effect sensor, and is not intended to be limiting in any way.

IV. Typical Embodiment of Speed Sensor Operation

A Hall effect (angular speed) sensor is mounted next to a rotating component with a known number, Z, of gear teeth, magnets, reflex tapes (in the case of an optical sensor) or other elements capable of exciting the sensor. This produces an electrical pulse from the analog sensor front end, which is either square, sinusoidal or other, depending on the nature of the sensor and excitation elements.

The analogue signal is sampled by an analog-to-digital converter (ADC) at the highest possible rate, $F_s$. A zero level is defined through which the analog electrical pulse is sure to pass in the direction, D, after each passing of an excitation element. The direction D can be ascending, or descending.

At each zero crossing, the number of samples, N, since the last crossing is recorded. The angular velocity, V, in Revolutions Per Second (RPS), is given by:

$$V = F_s / (N*Z)$$

The angular velocity, V, is broadcasted on the communications bus:
For each passing of an excitation element, or
For each predefined multiple of a passing of an excitation element, or
Whenever the angular velocity changes by a predefined factor.

Occasionally, it may be desirable to use a sensor such as those functionally described in FIGS. 2A, 2B, and 2C in a location that is deleterious to sensitive electronic components. One way to achieve this is to separate the sensing means (such as accelerometer 210 in FIG. 2A or speed sensor 310 in FIG. 2C) from the intelligent sensor module to create an intelligent sensor core that can then be connected directly to a remotely-located sensing device. FIG. 3 shows a block diagram of one embodiment of such an intelligent sensor core for use in a health and usage monitoring system.

In the intelligent sensor core of FIG. 3, the sensing means is separated physically from the sensor enclosure 300 and replaced with an analog sensing device interface 211. Analog sensing device interface 211 comprises the circuitry necessary to receive and process signals from a remote analog sensing device 212. The remote analog sensing device 212 is separated from and outside of the sensor enclosure 300, and may be mounted separately some distance away from the sensor enclosure 300. In one embodiment, the remote analog sensing device 212 is a non-digital sensing device that has been enclosed in an environmentally-hardened enclosure and designed to operate in harsh environments, such as inside an engine compartment. By separating the remote analog sensing device 212 from the sensor enclosure 300, the remote analog sensing device 212 can be mounted in a harsh environment while the sensitive electronics in the sensor enclosure 300 can be mounted in a safer environment.

Separating the sensing means from the rest of the electronics also allows the intelligent sensor core to be used with any number of commercially-available, non-intelligent sensing devices. This allows the frequency-adaptable HUMS of the current invention to use non-intelligent sensors already in use on a vehicle or in an application by adding processing components to the existing sensors to convert them to intelligent sensors. As previously described in the description of FIG. 2A, the analog switch/buffer 215 can be used to "pass through" raw data obtained directly from the remote analog sensing device 212 without doing any further processing in order to emulate the performance of the non-intelligent sensor for use with existing maintenance and ground-based tools.

FIGS. 4A through 4C illustrate various package designs for an intelligent sensor. FIG. 4A shows one possible embodiment of a package design for a flat-mounted intelligent sensor 410 which can be bolted to a flat surface. FIG. 4B shows an embodiment of a package design for a bolt-mounted intelligent sensor 420 which can be mounted underneath a bolt head. FIG. 4C shows an embodiment of a package design for a threaded intelligent sensor 430 which can be screwed into a plate for mounting.

The package design examples in FIGS. 4A, 4B, and 4C are intended to be exemplary only and not limiting in any way. Many other package designs can be used. The package designs shown herein are not in themselves inventive content, and are included only to help enable the invention by showing a realistic implementation of a package or enclosure design for an intelligent sensor as it might be used in the HUMS presented herein.

FIG. 5 shows a block diagram of a data acquisition unit for use in a health and usage monitoring system. This block diagram shows one possible embodiment of the primary data acquisition unit 100 of FIG. 1A, but could also represent an embodiment of optional additional data acquisition units 180.

The primary data acquisition unit 100 has a processor 500. This processor 500 is responsible for the processing and collection of the data received from the various sensors in the system, examples of which are shown in FIGS. 1A, 1B, and 1C. Signals are received from or transmitted to the sensors in the system via input/output pins 561A, housed in the connector 560. Blocks of communications circuitry 561 handle signals received from or transmitted via input/output pins 561A.

The primary data acquisition unit 100 has one or more blocks of memory 515 which can be used for the storage of sensor data received from the system, values calculated by the primary data acquisition unit 100, and system configuration information. An optional memory device interface circuit 550 allows the use of a removable memory device (not pictured), such as a memory card, chip, or other device. A memory device slot 552 is provided in the enclosure to allow a removable memory device to be inserted and removed.

The primary data acquisition unit 100 has an optional inertial navigation system (INS) 510 and a global navigation satellite system (GNSS) device 512 to provide information on the location and orientation of the primary data acquisition unit 100 in three-dimensional space. The INS 510 comprises devices which allow the measurement of linear accelerations and angular velocities. These devices may be solid-state accelerometers and gyroscopes, but may also be any appropriate sensing device for measuring the linear accelerations and angular velocities of a system.

The GNSS device 512 may comprise any appropriate device for receiving signals from geosynchronous satellites and/or ground-based stations. Common examples of deployed, available GNSS systems include the global positioning system (GPS) and the Russian GLONASS system. A GNSS antenna 566 is provided when the GNSS device 512 is present to aid reception of the GNSS signal.

Power is provided to the primary data acquisition unit 100 via power pins 569a and 569b. Power conditioning circuitry 507 filters and regulates the incoming power, and the power supply 520 provides the appropriate voltage levels for the various devices and sensors in the module. A status light emitting diode (LED) 547 is driven by status LED circuitry 545 and provides visual feedback to the operators as to the status of the system.

Figure 6:
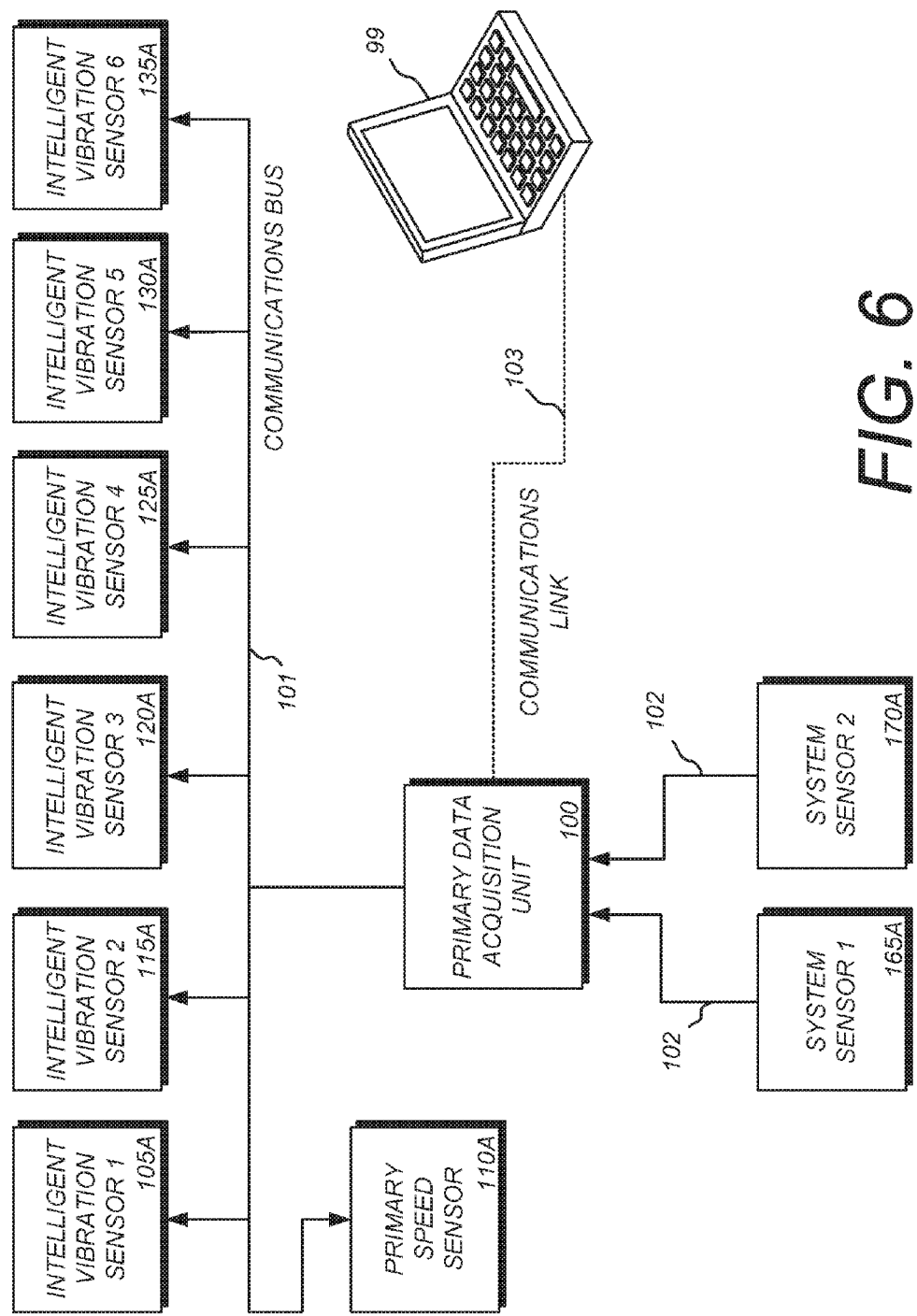
FIG. 6 is a block diagram showing a simplified version of an embodiment of the health and usage monitoring system described herein interfacing to a ground/maintenance tool for system configuration.

FIG. 6 is a block diagram showing a simplified version of an embodiment of the health and usage monitoring system interfacing to a ground/maintenance tool for system configuration. In this embodiment, a primary data acquisition unit 100 is connected to a series of intelligent sensors via a communications bus 101. The series of intelligent sensors could include any number or combination of the intelligent sensors described herein, but for the purposes of illustration, FIG. 6 shows a primary speed sensor 110A, an intelligent vibration sensor 1 105A, an intelligent vibration sensor 2 115A, an intelligent vibration sensor 3 120A, an intelligent vibration sensor 4 125A, an intelligent vibration sensor 5 130A, and an intelligent vibration sensor 6 135A. The intelligent vibration sensors shown would be distributed in a system such as those described in FIG. 1A, 1B, or 1C, or a similar system, such that they would monitor the assigned vibration frequencies of critical components in that system.

FIG. 6 also shows the primary data acquisition unit 100 connected to two system sensors. Again, the system sensors shown, system sensor 1 165A and system sensor 2 170A, are meant to be exemplary and represent any number or combination of the non-intelligent sensors described in this specification. These system sensors 165A and 170A are connected via a direct-wired connection 102 to the primary data acquisition unit 100. These system sensors 165A and 170A may be temperature sensors, pressure sensors, level sensors, or any other appropriate type of sensor which provide additional environmental information about the vehicle or application in which the HUMS is installed.

The primary data acquisition unit 100 is connected via a communications link 103 to a ground/maintenance tool 99. The communications link 103 may be any appropriate means of connecting the primary data acquisition unit 100 to the ground/maintenance tool 99, including but not limited to a serial communications interface such as an RS232 or USB connection, a communications bus such as a CAN bus, a wireless connection, or any other appropriate means for connecting the two units.

The ground/maintenance tool 99 may be a laptop or personal computer or a special-purpose computer designed specifically for interfacing to the primary data acquisition unit 100. Software programs running on the ground/maintenance tool 99 are used to communicate with the primary data acquisition unit 100 and configure the HUMS for operation. Alternately, the ground/maintenance tool 99 may be used to download information from the HUMS or to monitor it during operation. Additional information on the operation of the ground/maintenance tool 99 is provided in FIG. 7.

Figure 7:
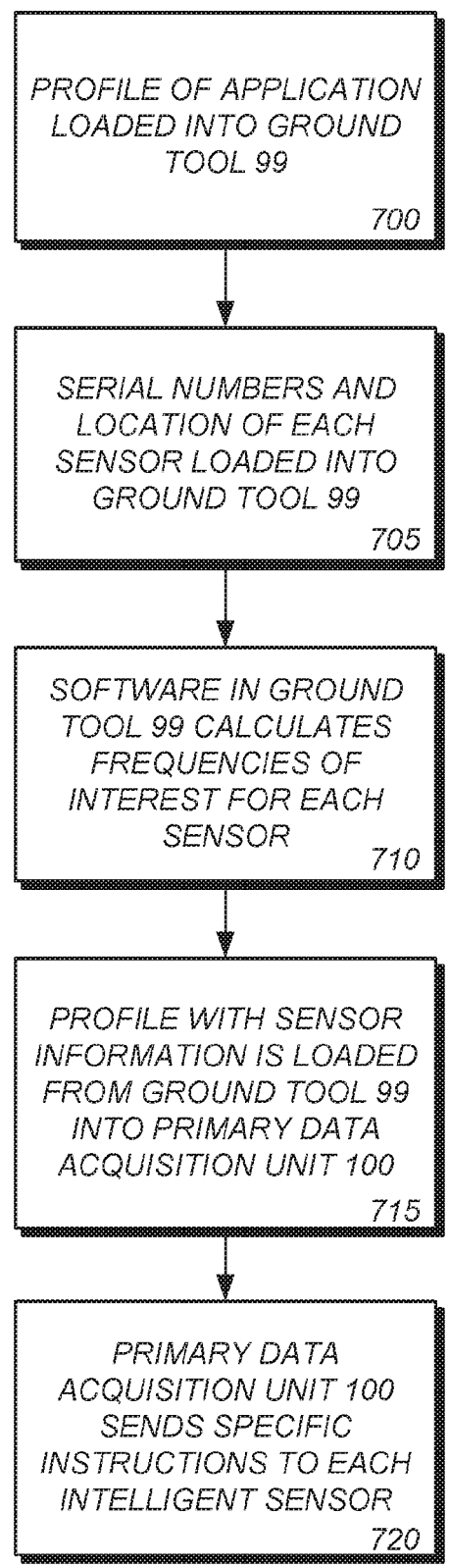
FIG. 7 is a flowchart showing how a ground/maintenance tool can be used to configure a health and usage monitoring system for initial use.

FIG. 7 is a flowchart showing how the ground/maintenance tool 99 can be used to configure a health and usage monitoring system for initial use. The ground/maintenance tool 99 is connected to the primary data acquisition unit 100 as shown in FIG. 6. A program operating on the ground/maintenance tool 99 is executed, and a profile of the application (vehicle, mill equipment, etc.) on which the HUMS is deployed is loaded into the ground/maintenance tool 99 (Step 700). This application profile contains, at a minimum, information on the type of application on which the HUMS is deployed, expected or typical performance ranges for the application, and a list of the number and types of sensors and other components deployed on the application.

An operator uses the ground/maintenance tool 99 to enter the serial numbers and locations within the application of each sensor (Step 705). Using stored information from the application profile and based on the type of each sensor in the system, the software in the ground/maintenance tool 99 calculates a set of "frequencies of interest" for each sensor (Step 710). For a given sensor, the frequencies of interest are those vibration or speed frequencies that can be expected to be detected by that sensor given its location in the end application. For example, in a rotorcraft, the vibration frequency seen by the gearbox rotation speed sensor 150 (from FIG. 1A) can be expected to be related by some predetermined ratio to the vibration frequency seen by the transmission input speed sensor 110. The ratio relating these two system components on a rotorcraft may vary depending on the type of rotorcraft and the gearing ratio between those components, and so the calculated frequencies of interest are dependent on the end application profile.

A typical frequency seen by a vibration sensor in a HUMS will be caused by the interaction of moving components in the end application. For example, when a rotating shaft in a rotorcraft is geared to a second rotating shaft, vibration frequencies are created by the metal teeth on the intermeshed gears as they move together.

Once Step 710 is completed, the application profile with its calculated sensor information is loaded from the ground/maintenance tool 99 into the primary data acquisition unit 100 (Step 715). The primary data acquisition unit 100 then communicates with each intelligent sensor in the end application system, sending the sensors specific instructions on how to operate, including the frequencies of interest specific to each sensor (Step 720).

Once the intelligent sensors in the system are programmed with their specific instructions and know their frequencies of interest to monitor, the HUMS operates as shown in FIG. 8A, or alternately FIG. 8B. Turning first to FIG. 8A, the HUMS assigns one of its speed sensors to be the primary speed sensor 110A (as shown in FIG. 6). The primary speed sensor 110A represents a critical speed within the end application around which all other system speeds are calculated. For example, in a rotorcraft such as the one shown in FIG. 1A, the transmission input speed sensor (N2) 110 may be used as the primary speed sensor 110A, as all of the other speeds seen by components in the rotorcraft are based on the speed seen at the transmission input speed sensor 110. All of the rotating or moving components on the rotorcraft are geared to the transmission system, and thus a change seen in the transmission input speed sensor 110 will be seen by the other components in the system, albeit altered by the gear ratio between the components.

In FIG. 8A, the primary speed sensor 110A sends a message containing its current speed reading to the primary data acquisition unit 100 (Step 800A). Optionally, the primary data acquisition unit 100 may alter the base reading received from the primary speed sensor 110A based on information obtained from other system sensors (Step 803A). The primary data acquisition unit 100 then broadcasts this base speed reading to the other intelligent sensors in the application (Step 805A). Each sensor in the application receives this broadcast speed reading from the communications bus 101 and uses this reading to re-scale its specific frequencies of interest (Step 810A). That is, since the rotating or moving components in the end application are all geared to each other, a change in the speed reading sent out by the primary speed sensor 110A will affect the frequencies of interest of each sensor in the system. Each sensor in the system then uses the re-scaled frequencies of interest to obtain new readings, and sends the new readings back to the primary data acquisition unit 100 for processing and storage (Step 815A).

FIG. 8B is a flowchart showing an alternate method to that of FIG. 8A for how a health and usage monitoring system uses communication directly among intelligent, networked sensors to calculate frequencies of interest to which the intelligent sensors are tuned to monitor. In this alternate embodiment, the intelligent sensors in the system do not pass messages to each other through the primary data acquisition unit 100, but instead take advantage of the fact that all intelligent sensors can communicate directly with each other on the communications bus 101. In this case, the primary speed sensor 110A sends the message containing the base speed reading directly to the other intelligent sensors in the system via the communications bus 101 (Step 800B). Once the base speed reading is received by the sensors, each intelligent sensor re-scales its specific frequencies of interest (Step 810B), and uses these re-scaled frequencies to obtain new readings to send to the primary data acquisition unit 100 (Step 815B).

FIG. 9 shows a table presenting four possible modes of operation for the frequency-adaptable health and usage monitoring system presented herein. These modes of operation are enabled by the distributed network of intelligent sensors that provide the core of the present invention.

Mode 1 is called "Simple Data Record Mode." In Mode 1, the intelligent sensors record frequency data and transmit the data directly to the primary data acquisition unit 100 for storage and later analysis and comparison to historical trend data. The data is not interpreted by the sensors directly, but simply recorded and sent for collection to the primary data acquisition unit 100. This information is later retrieved and analyzed off-board, typically by a team of human experts.

Mode 2 is called "System Fault Alert Mode." In Mode 2, the intelligent sensors take advantage of their local processing power and analyze the frequency data they detect directly instead of passing to the primary data acquisition unit 100. Instead of passing the full recorded data to the primary data acquisition unit 100 for later analysis, the intelligent sensors detect faults locally and directly in real-time, and then pass a message containing information about the fault to primary data acquisition unit 100 (as well as other sensors in the system). Faults are detected immediately as the system is in operation, and the information is communicated as necessary in real-time. Optionally, the messages containing the faults can contain a certain amount of digitized vibration data recorded immediately before the fault event, which can be processed by the primary data acquisition unit 100 or stored for later analysis.

Mode 3 is called "Analog Pass-Through Mode." In Mode 3, the intelligent sensors are configured to mimic older style (non-intelligent) sensors by simply detecting the frequency data and passing the raw frequency data out as an analog signal on analog outputs built into each intelligent sensor. This mode can be used in conjunction with existing ground tools and maintenance systems which will only work with older, existing (non-intelligent) sensors (such as piezoelectric analog sensors).

Mode 4 is called "Digitized Waveform Mode." In Mode 4, intelligent sensors capture the analog frequency waveforms from the component they are monitoring and convert it to digital data. In this way, the frequency waveforms can be transmitted to other components in the system, including the primary data acquisition unit 100, as digital communication messages.

Advantages of the HUMS described herein over the prior art are numerous. One advantage is that the network of distributed intelligent sensors can each perform localized processing on the sensor data before sending the data to the centralized primary data acquisition unit. Since each intelligent sensor knows what frequencies of interest it is monitoring, and because each sensor has its own processing power, the sensors do not need to constantly send frequency data through the network. Instead, they can decide only to send data when a fault condition is detected or some pre-determined threshold has been met. This reduces the data load traveling through the system, and significantly reduces or eliminates the need for off-board data analysis by a team of human experts.

Another advantage of the HUMS presented herein over the prior art is the ability to detect flight regimes, or different modes of operation. For example, in a typical prior art HUMS for a rotorcraft, the pilots or operators need to manually initiate the system to collect data when they know that the aircraft has entered into a known "flight regime." Examples of flight regimes are "on ground," when the aircraft is operating but still on the ground, and "cruise," when the aircraft is flying straight at a steady rate of speed with no bank angle. By placing the aircraft into one of these known flight regimes, the operators know that they can manually initiate the data capture mode of the HUMS because the aircraft is in a known, predictable condition. The present invention, however, takes advantage of intelligent sensors and a primary data acquisition unit which contains an inertial measurement unit (IMU) which can detect the orientation, speed, and location of the aircraft at any given moment in time. This added intelligence allows the HUMS of the present invention to automatically detect when a specific flight regime has been entered, and can automatically trigger data capturing based on that event. Since the IMU can detect the exact orientation of the aircraft, the HUMS of the present invention can also capture data during different flight regimes other than just "on ground" or "cruise." For example, the system can detect when the aircraft is in a 45-degree bank to the left, and can compare captured data from this flight regime with previously recorded data from a similar flight regime. Since the banking of an aircraft can induce new and additional stresses on aircraft components, this ability to work in non-standard flight regimes may increase the ability to detect anomalies in the aircraft's performance before the situation becomes critical.

An additional advantage of the system is that is reduces the amount of wiring seen in a typical prior art system by placing the intelligent sensors on a common communications bus. Instead of each sensor in the system requiring its own dedicated connection (typically an expensive and fragile coaxial cable or similar connection) to a central unit, each intelligent sensor in the present invention can be hung from a common bus, greatly reducing the number of connections required to the central unit, reducing wiring and complexity and increasing reliability. Also, since each intelligent sensor has its own processing power, the intelligence of the system is distributed, providing a measure of redundancy not available in typical prior art systems. For example, if a connection in a prior art HUMS is broken, critical information from that sensor will not make it to the central collection point. In the present invention, however, each sensor is capable of receiving data from each of the other intelligent sensors in the system, as well as from the primary data acquisition unit, and so information can be routed throughout the system, bypassing malfunctioning nodes or breaks in connections.

Having described the preferred embodiment, it will become apparent that various modifications can be made without departing from the scope of the invention as defined in the accompanying claims. For example, the number and specific types of intelligent sensors used in the HUMSs and SHMSs described herein can vary without changing the inventive concept. The HUMS of the present invention may also be configured differently than shown in the figures provided. For example, in some embodiments of the present invention, the primary data acquisition unit may be eliminated and the processing it performed could be distributed to the intelligent sensors in the system. That is, each intelligent sensor could perform part or all of the duties previously performed by the primary data acquisition unit as described in this application.

Also, other end applications than those shown in FIGS. 1A, 1B, and 1C could be considered. For example, land-based vehicles such as automobiles and trucks may use a SHMS or HUMS similar to those systems presented herein. Similarly, other types of manufacturing facilities besides the paper mill application described herein could use the described invention or an alternate embodiment thereof.

The HUMS described herein could be used as part of a flight operations quality assurance (FOQA) program. Information recorded by the intelligent sensors may be recorded for each flight or use of the system and compared against expected usage profiles to determine if "exceedances" have occurred (when the system performed outside of its normal expected operating profile). The location and orientation data captured by the present invention (using a combination of data from the inertial measurement unit, GNSS receiver, and other system components) could be used to record data during a flight, and that recorded data could be used later to create a recreation of the flight, wherein exceedance events (such as a vibration reading moving outside of its expected envelope) could be indicated graphically on the playback of the recorded flight. This may help operators and maintenance staff to determine that certain types of exceedances only occur during certain types of flight regimes.

Having thus described the invention, what is claimed as new and desired to be secured by Letters Patent is:

1. A method for creating a real-time health and usage monitoring system for an aircraft, the method comprising the steps of:

physically mounting multiple intelligent sensors on one or more physical components of the aircraft;

wherein each said intelligent sensor comprises a signal processor, a software program operating said signal processor, a vibration sensor, and a transceiver for transmitting data from said intelligent sensor, thereby detecting vibrations within a respective physical component of said aircraft;

connecting the intelligent sensors by a communications network;

connecting a central control module to the communications network;

loading operational profile information into the central control module, wherein the operational profile information defines an acceptable performance range for each of the operating components;

using the intelligent sensors to detect when said physical component is performing outside a predefined acceptable performance range as stored within and determined by said central control module;

generating a notification upon detection that said physical component has moved outside of a predefined acceptable performance range and sending said notification via said communications network to a designated operator;

wherein said predefined acceptable performance range is detectable by said intelligent sensors based upon vibrations transmitted through said physical component;

wherein the step of generating said notification is defined by a method selected from the group: communicating in real-time to said designated operator, transmitting information from a remote location to said aircraft, and storing the information for later retrieval and processing;

detecting a present flight regime of said aircraft with said intelligent sensors and an inertial measurement unit, said flight regime at least comprising said aircraft's orientation, speed, and location;

comparing said present flight regime of said aircraft with a previously stored flight regime using said central control module;

detecting anomalies between said present flight regime and said previously stored flight regime, thereby generating anomaly data; and updating said notification with anomaly data.

2. The method for creating a real-time health and usage monitoring system of claim 1, further comprising the step of commanding the central control module to place the health and usage monitoring system into one of several pre-defined operational modes.

3. The method for creating a real-time health and usage monitoring system of claim 2, wherein the pre-defined operational modes comprise a simple data record mode, system fault alert mode, analog pass-through mode, and a digitized waveform mode.

4. The method of claim 1, wherein said aircraft is a helicopter.

5. The method of claim 4, wherein said physical component is a component selected from the list comprising: an engine; a gearbox; and a rotor.

* * * * *